United States Patent
Cheeseman et al.

(10) Patent No.: US 11,695,176 B2
(45) Date of Patent: Jul. 4, 2023

(54) ZINC-AIR BATTERY COMPOSITIONS AND METHODS

(71) Applicant: Revolution Power Inc., Seattle, WA (US)

(72) Inventors: Halle Cheeseman, Orlando, FL (US); Daniel Wainwright Shaw, Seattle, WA (US); James Bradley Downar, III, Seattle, WA (US); Jonathan Mark Sassen, Ramat Beit Shemesh (IL); Lucien Fontaine, Cedar Park, TX (US); Viet Vu, Leander, TX (US); Keith W. Kirkwood, Bainbridge Island, WA (US)

(73) Assignee: REVOLUTION POWER INC., Seattle, WA (US)

( * ) Notice: Subject to any disclaimer, the term of this patent is extended or adjusted under 35 U.S.C. 154(b) by 103 days.

(21) Appl. No.: 17/313,644

(22) Filed: May 6, 2021

(65) Prior Publication Data

US 2021/0351460 A1      Nov. 11, 2021

Related U.S. Application Data

(60) Provisional application No. 63/020,670, filed on May 6, 2020, provisional application No. 63/020,655, filed on May 6, 2020.

(51) Int. Cl.
*H01M 12/08* (2006.01)
*H01M 4/42* (2006.01)
(Continued)

(52) U.S. Cl.
CPC .............. *H01M 12/08* (2013.01); *H01M 4/42* (2013.01); *H01M 4/587* (2013.01); *H01M 4/628* (2013.01);
(Continued)

(58) Field of Classification Search
CPC ..................................... H01M 12/08
See application file for complete search history.

(56) References Cited

U.S. PATENT DOCUMENTS 6,248,463 B1 *   6/2001   Dopp ................. H01M 12/06
                                                        429/405
6,558,828 B1     5/2003   Guo
(Continued)

FOREIGN PATENT DOCUMENTS

CN     106329031 A     1/2017
CN     111092279 A     5/2020
(Continued)

OTHER PUBLICATIONS

International Search Report and Written Opinion dated Aug. 26, 2021, Patent Application No. PCT/US2021/031113, 8 pages.

(Continued)

*Primary Examiner* — Brian R Ohara
(74) *Attorney, Agent, or Firm* — Davis Wright Tremaine LLP

(57) ABSTRACT

A zinc-air battery cell assembly comprising: a layer of anode material; one or more layers of cathode material; a separator directly between and engaging both the layer of anode material and the layer of cathode material that acts as both an electronic insulator and an ion conductive path between the layer of anode material and the layer of cathode material; and a diffusion member directly engaging the layer of cathode material.

19 Claims, 18 Drawing Sheets

(51) Int. Cl.
    *H01M 4/587*     (2010.01)
    *H01M 4/62*     (2006.01)
    *H01M 50/411*     (2021.01)
    *H01M 50/44*     (2021.01)
    *H01M 50/46*     (2021.01)
    *H01M 50/586*     (2021.01)

(52) U.S. Cl.
    CPC ......... *H01M 50/411* (2021.01); *H01M 50/44* (2021.01); *H01M 50/46* (2021.01); *H01M 50/586* (2021.01)

(56) References Cited

U.S. PATENT DOCUMENTS

| | | |
|---|---|---|
| 2006/0269811 A1 | 11/2006 | Lange et al. |
| 2007/0283558 A1 | 12/2007 | Kelemen et al. |
| 2010/0040936 A1* | 2/2010 | Pozin .................... H01M 6/045 429/406 |
| 2011/0027666 A1 | 2/2011 | Burchardt et al. |
| 2011/0059355 A1* | 3/2011 | Zhang .................... H01M 6/16 429/188 |
| 2011/0269030 A1 | 11/2011 | Moore |
| 2016/0268660 A1 | 9/2016 | Oh |
| 2017/0018761 A1* | 1/2017 | Ogino .................... H01M 4/622 |
| 2017/0279126 A1* | 9/2017 | Dreher ................ H01M 4/8652 |
| 2019/0173141 A1 | 6/2019 | Parker et al. |

FOREIGN PATENT DOCUMENTS

| | | |
|---|---|---|
| KR | 101123636 B1 | 3/2012 |
| WO | 0041264 A1 | 7/2000 |
| WO | 2010124172 A2 | 10/2010 |
| WO | WO-2010124172 A2 * | 10/2010 .......... H01M 10/052 |
| WO | 2016112329 A1 | 7/2016 |

OTHER PUBLICATIONS

International Search Report and Written Opinion dated Nov. 18, 2022, Patent Application No. PCT/US2022/034389, 9 pages.

* cited by examiner

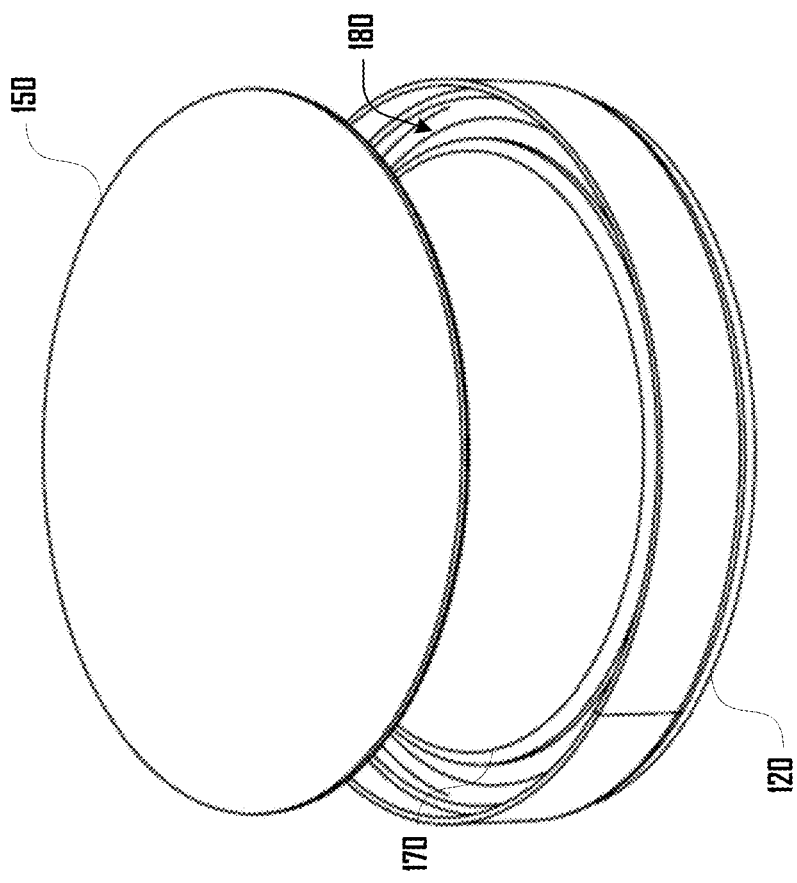
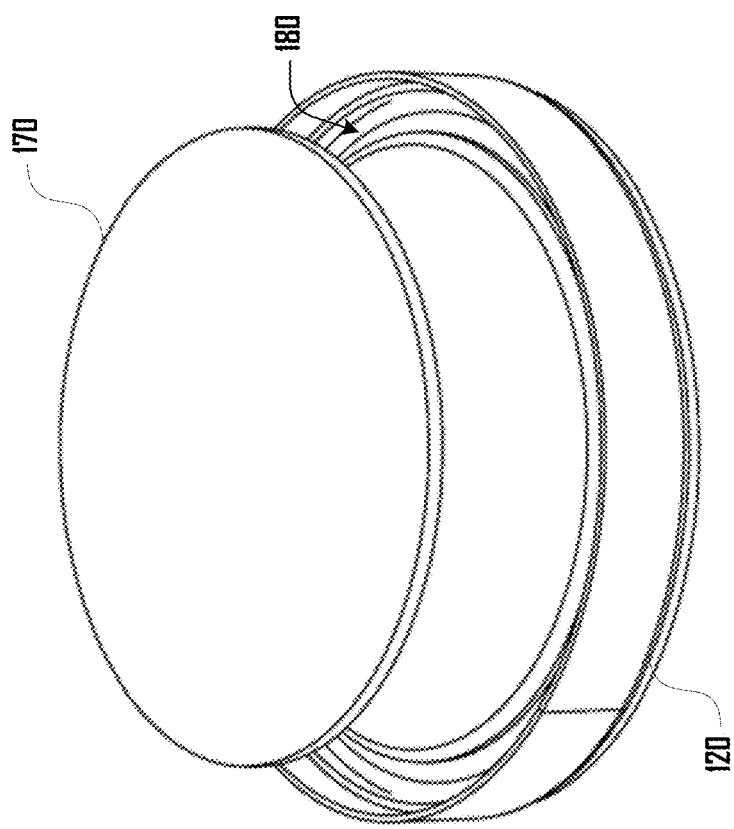

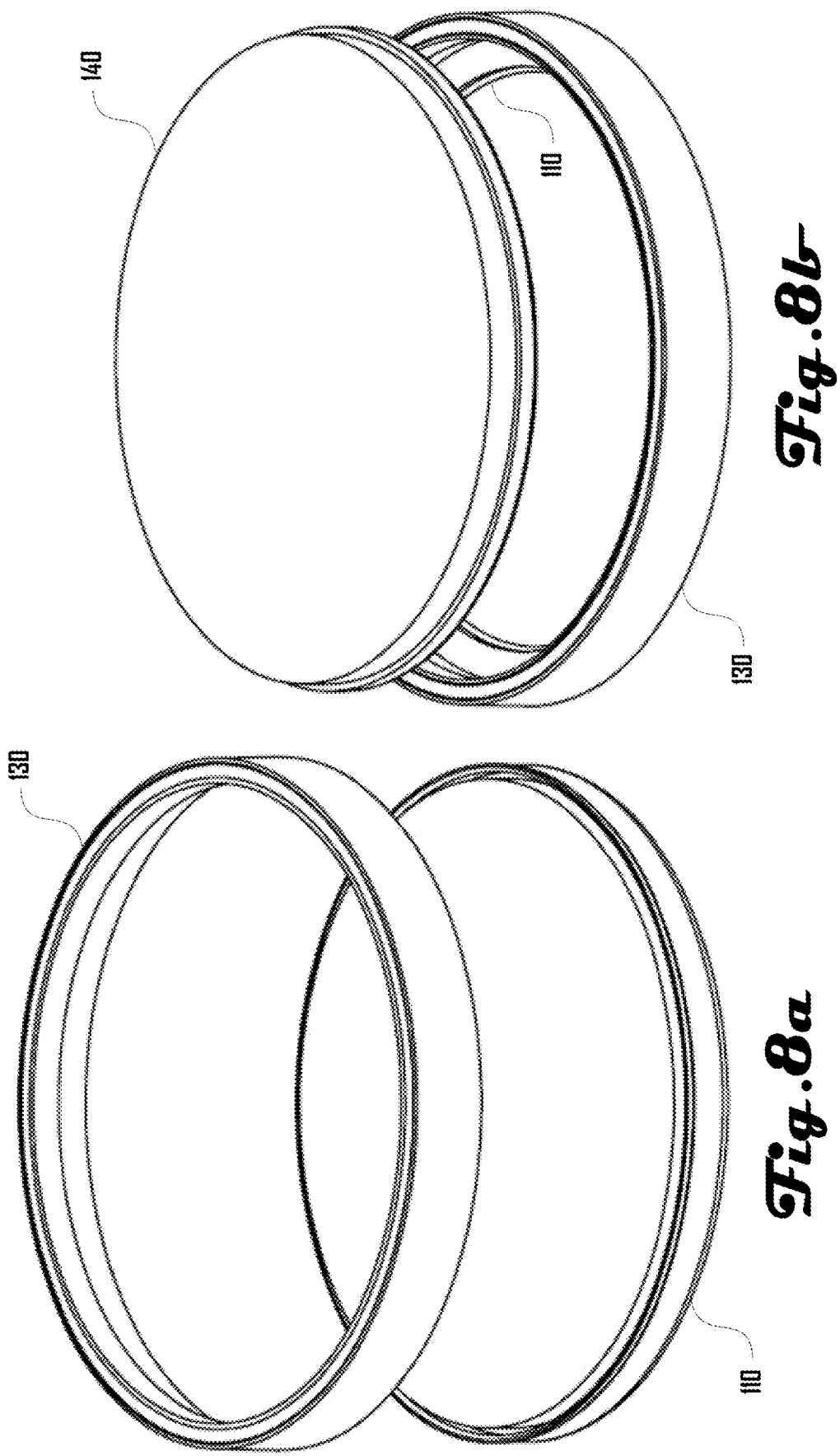

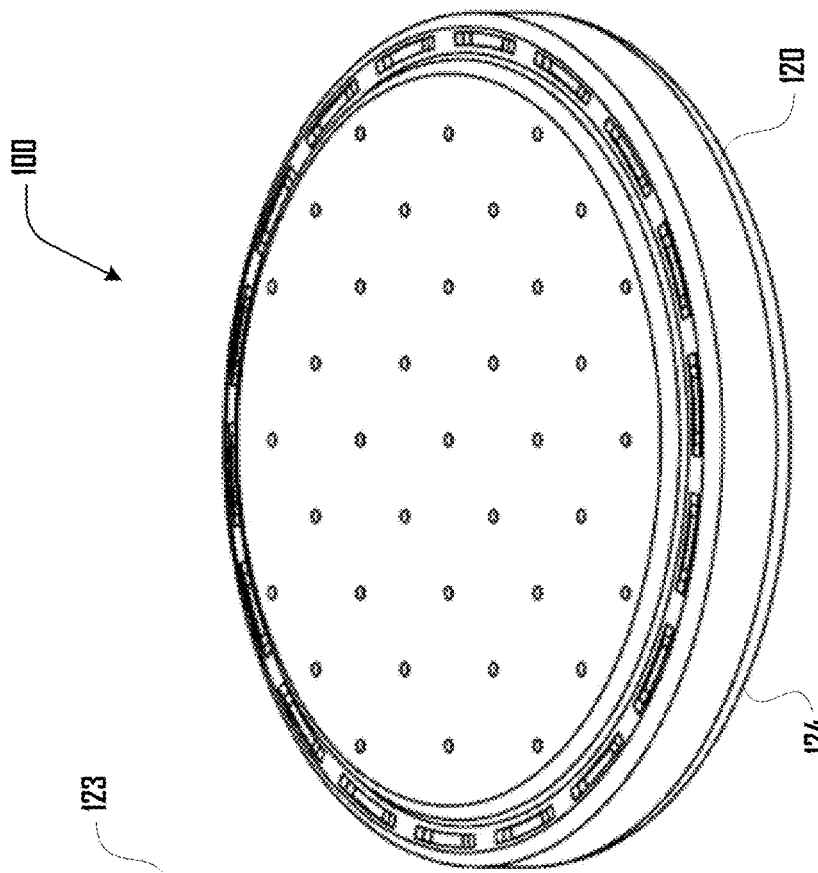
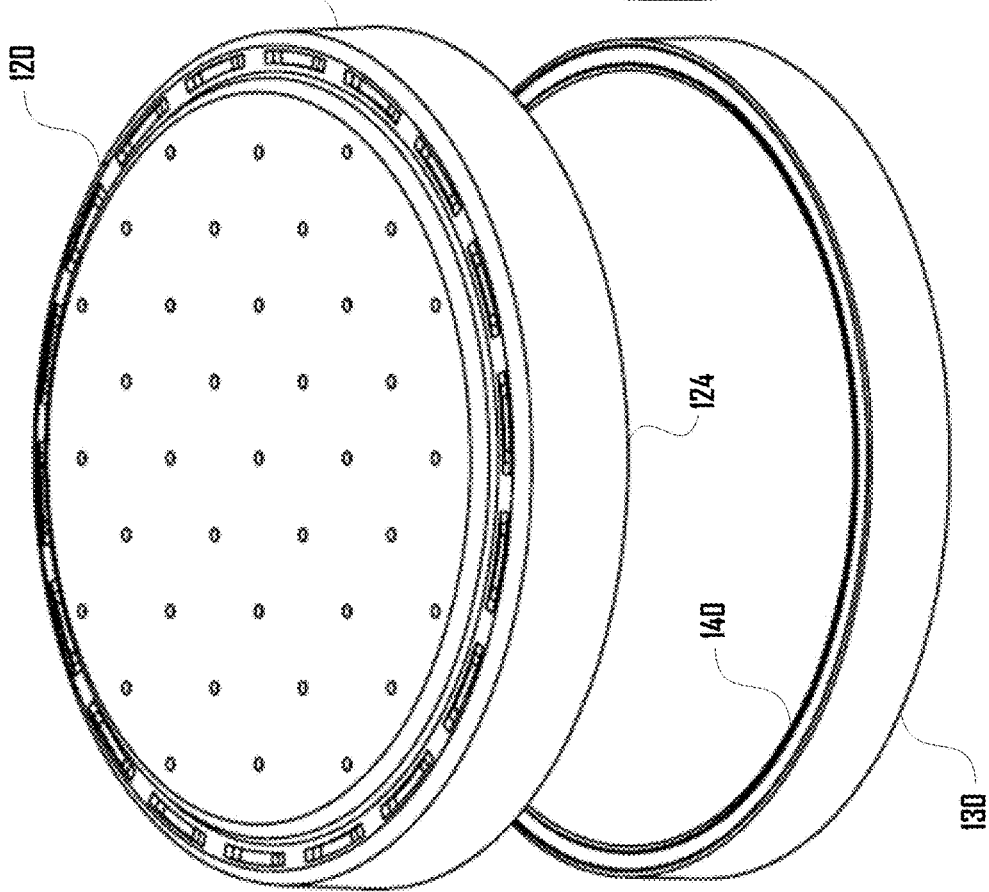

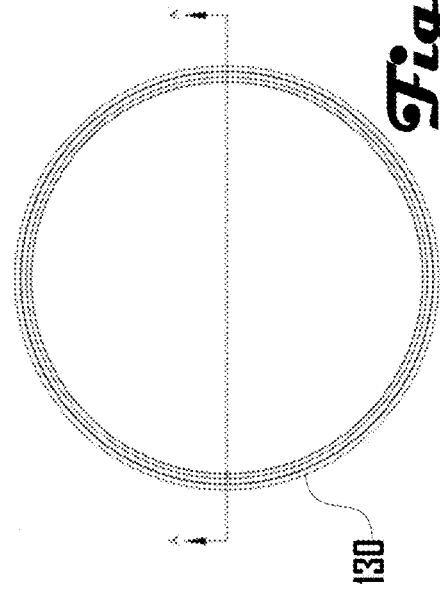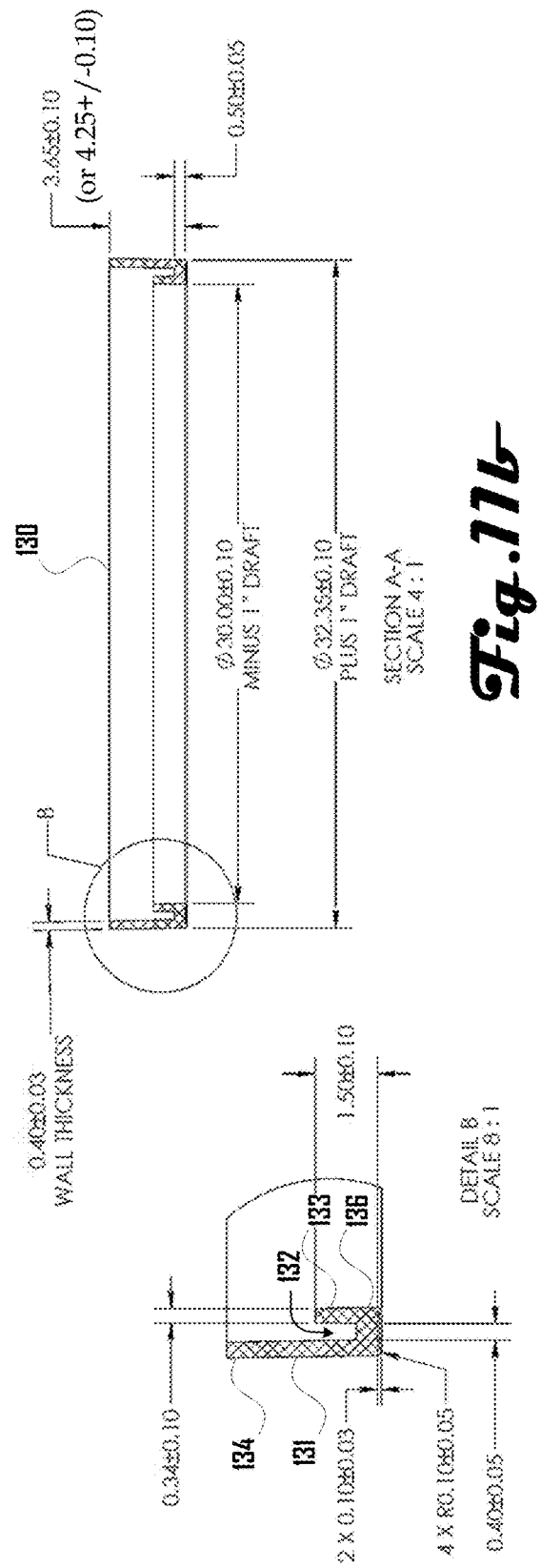

DETAIL D
LANCE CROSS SECTION
SCALE 16 : 1

DETAIL E
SCALE 16 : 1

DETAIL F
SCALE 4 : 1

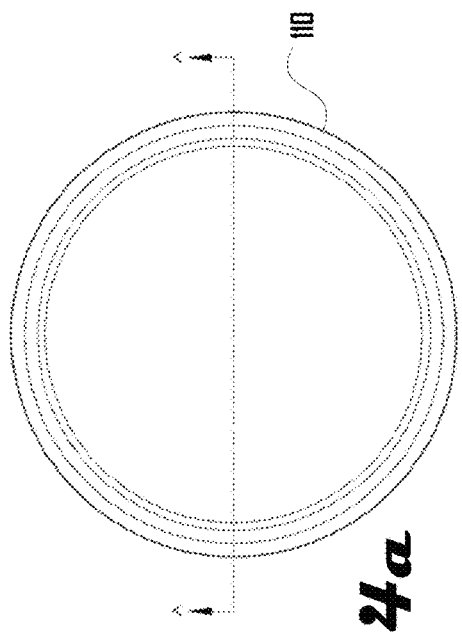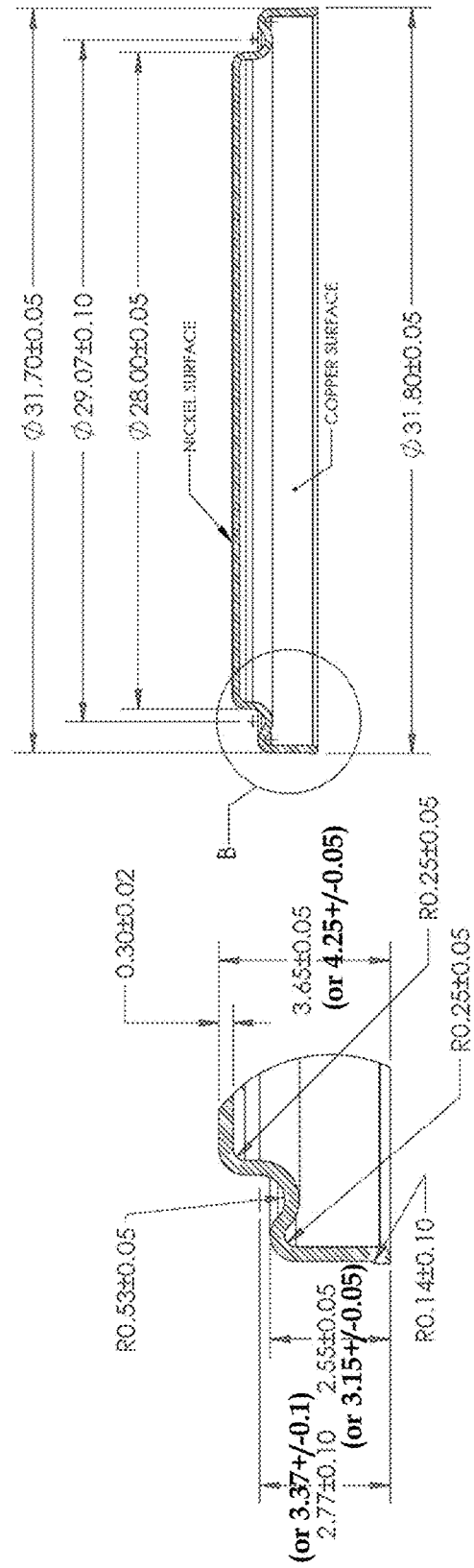

Air Hole design on cathode can

$$Q_{O2} = [A/L][D_{O2/air}][\Delta C]$$

ZINC-AIR BATTERY COMPOSITIONS AND METHODS

CROSS-REFERENCE TO RELATED APPLICATIONS

This application is a non-provisional of and claims the benefit of U.S. Provisional Application No. 63/020,655, filed May 6, 2020, entitled "ZINC-AIR BATTERY SYSTEMS AND METHODS,". This application is hereby incorporated herein by reference in its entirety and for all purposes.

This application is a non-provisional of and claims the benefit of U.S. Provisional Application No. 63/020,670, filed May 6, 2020, entitled "ZINC-AIR BATTERY COMPOSITIONS AND METHODS,". This application is hereby incorporated herein by reference in its entirety and for all purposes.

BRIEF DESCRIPTION OF THE DRAWINGS

FIG. 7a illustrates a method where a separator is inserted into the cavity of a cathode can.

FIG. 7b illustrates a method where a cathode disc is inserted into the cavity of a cathode can over the separator to generate a cathode can assembly.

FIG. 8a illustrates a method where a grommet is inserted into an anode can.

FIG. 8b illustrates a method where anode material is inserted into the assembly of the anode can and grommet to generate an anode can assembly.

FIG. 9a illustrates a method where a cathode can assembly is placed into an anode can assembly.

FIG. 9b illustrates a method where the terminal end of the cathode is crimped to a curved configuration such that the end of the cathode sidewall curls over the ridge and slot of the anode can to generate zinc-air battery cell assembly.

FIG. 10b illustrates an example cross section of the embodiment of FIG. 10a.

FIG. 11a illustrates a top view of a grommet in accordance with an embodiment.

FIG. 11b illustrates a cross section of the grommet of FIG. 11a.

FIG. 11c illustrates a detail view of a portion of the grommet of FIG. 11b.

FIG. 12b illustrates a cross-section of the embodiment of FIG. 12a.

FIG. 14a illustrates and example embodiment of an anode can.

FIG. 14b illustrates a cross section of the example embodiment of the anode can of FIG. 14a.

FIG. 14c illustrates a close-up detail view of a portion of the anode can of FIG. 14b.

Figure 1:
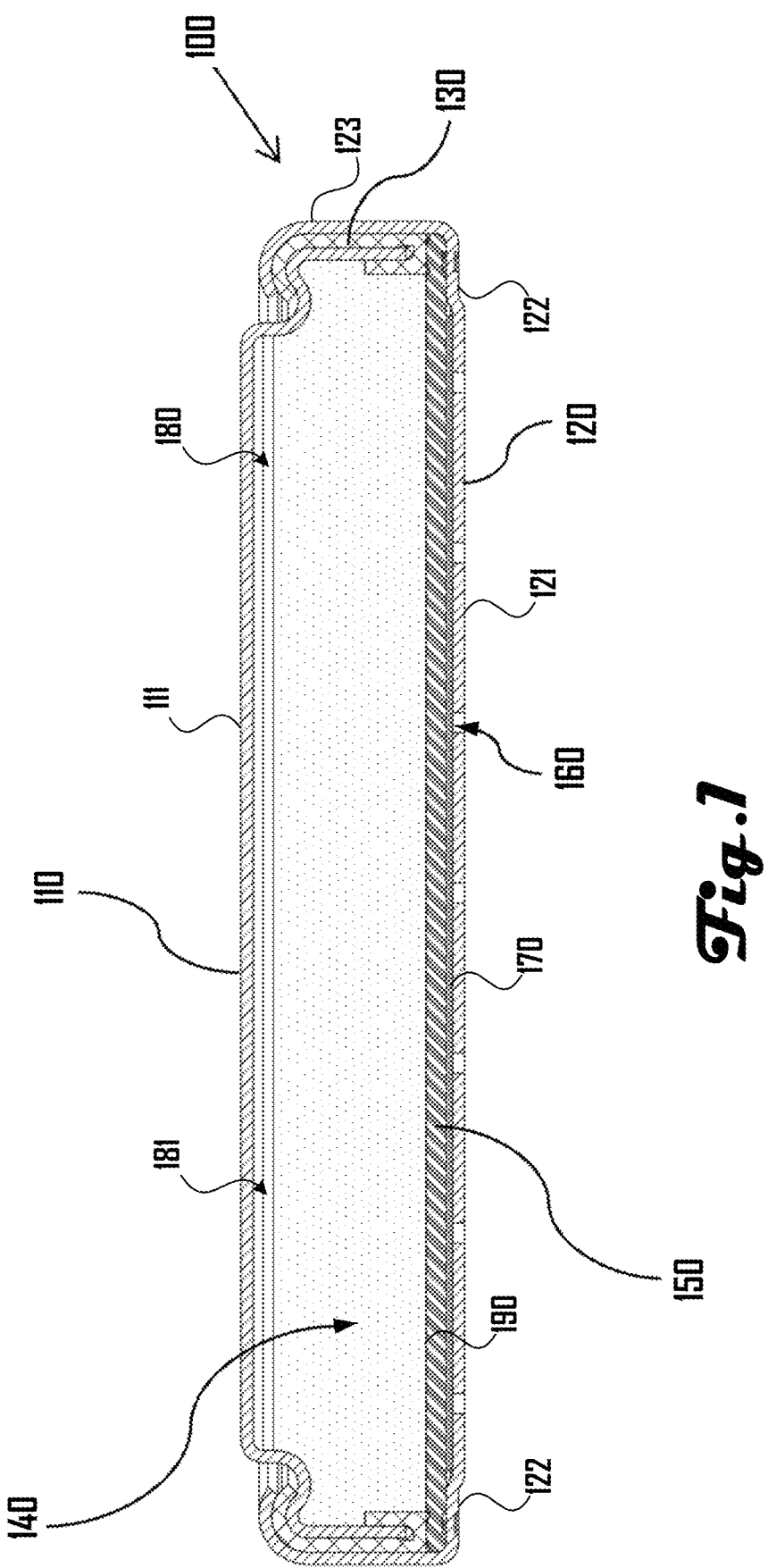
FIG. 1 illustrates an example of a zinc-air battery cell assembly having an anode and cathode can that define a cavity with anode and cathode materials disposed within the cavity.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Some zinc-air batteries can include the use of a welded woven or expanded metal grid outside of the cathode material being connected to the cathode can by a metal grid welded to the cathode can being pressed between the cathode can and the cathode disk. However, in some examples, such a method over time can have a decrease in electrical connection as there is not a permanent and constant constraining force to keep the two members in contact because the cathode layer in contact with metal is expanding and contracting during use, which can lead to separation of the two. An elastic and compressive conductive layer like carbon felt/foam/pliable paper can provide a permanent and secure contact because this conductive layer can expand and retract with the cathode as needed. These materials can be very conductive.

Additional zinc-air batteries can include the use of an annular ring in the cathode can which presses into the cathode material but still makes use of an external welded woven or expanded metal grid for electrical contact between the cathode can and the cathode material. As with the previous case, the electrical connection can, over time, decrease due to a loss of constraining pressure in some examples. In addition, this embodiment can cause, in some examples, the cathode to bow away from the wire mesh grid resulting in a decreased anode cavity which provides a decreased cell capacity.

In view of the foregoing, a need exists for an improved sealing system and method for improving the electrical connection between the cathode can and cathode material in an effort to overcome the aforementioned obstacles and deficiencies of conventional zinc-air battery systems.

In some aspects, the present disclosure relates to a zinc-air battery cell assembly having a cathode assembly that includes the following layers in the following order: separator-cathode active layer-cathode conductive layer-conductive diffusion pad. The cathode active layer can comprise PTFE, carbon and manganese dioxide (or transitional metal oxides). A nickel mesh can be embedded in the cathode layer and in some examples, the mesh is preferably positioned away from the separator. The purpose of the cathode active layer can be to enable an Oxygen Reduction Reaction (ORR), which generates electrical energy. The cathode active layer can have a mix of both hydrophobic and hydrophilic properties. The cathode active layer can allow air diffusion and can be electrically conductive. The cathode conductive layer, in some examples, contains no transition metal oxide and/or only contains PTFE and carbon. PTFE content in various embodiments can be higher in the cathode conductive layer than the cathode active layer. In various examples, the cathode conductive layer can be totally or substantially hydrophobic and enables electronic conduction and air diffusion. The conductive diffusion pad can sit between a cathode can and the cathode conductive layer. In some examples, the conductive diffusion pad can comprise carbon foam, felt or paper. In some examples, the conductive diffusion pad can comprise a nickel mesh grid, foam or expanded metal welded to the cathode can, or the like.

In some aspects, the present disclosure relates to the achievement of high-power performance and the reduction of performance variability that can exist in some zinc-air batteries. Various embodiments relate to high-power single use zinc-air batteries. "High Power" in various embodiments and for portable applications that utilize a Zinc Air Battery can be a battery product that achieves continuous areal power capability of equal or greater than 50 mW/cm$^2$. Various examples can define a reaction area of a battery product as the interfacial area between the zinc anode and air cathode.

In one aspect, presence of a mesh in the cathode is combined with the use of a conductive diffusion layer. The role of the mesh embedded in the cathode can change from its traditional role of cathode conductor in the radial plane to more that of a structural support that allows that cathode to be made with more consistency and more cohesion.

In a further aspect, the number of holes in a zinc-air battery can be over 5 per cm$^2$ and the hole diameter can be equal or greater than 0.5 mm. The holes can be arranged in a pattern so that no hole is further than 5 mm from the hole closest to it or from the edge of the air cathode.

In yet another aspect, the cell can be permitted to bulge by between 5-25%, which can be as a result of a high power (e.g., 50-135 mW/cm$^2$) discharge reaction. This can allow a reduction of the void volume in a cell and can promote better anode consistency, connectivity with the anode current collector and an increase in the overall anode capacity.

In various embodiments, such aspects separately and/or together, can improve the high-power performance of primary zinc air cells. Such a battery in some examples can provide performance benefits to small (portable) rechargeable devices such as a cell phone.

Various embodiments can lead to a higher more consistent cathode running voltage and a zinc anode that is less susceptible to passivation and premature failure. In some examples of a zinc air product these can be experienced in a device as either: More power (W) capability for a given run time; more run time for a given power drain; or combinations thereof.

Turning to FIG. 1, various embodiments can include zinc-air battery cell assembly 100 that comprises a cathode can 120 made of a metallic material compatible with the electrochemistry of the cell assembly 100 as discussed in more detail herein. The material of the cathode can 120 can comprise nickel-plated steel in some embodiments. The cathode can 120 can comprise a plurality of holes 160 defined by a bottom planar base 121 of the cathode can 120 which can allow air passage into the zinc-air battery cell assembly 100 at a calculated rate, which can produce a redox reaction that generates an electrical circuit within the zinc-air battery cell assembly 100.

The zinc-air battery cell assembly 100 can also comprise an anode can 110, which can be made of a metallic material. The anode can 110 in some examples can comprise, consist essentially of or consist of a tri-layer material containing a copper layer, a steel layer and a nickel layer. In another embodiment, the anode can 110 can comprise, consist essentially of or consist of a bi-layer material having a copper layer and a stainless steel layer with the copper layer being an internal surface and in contact with or facing an anode material 140 disposed within a cavity 180 defined by the anode can 110 and cathode can 120.

A grommet 130 can surround the anode can 110 that can be made of a thermoplastic material coated with styrene-butylene-styrene block copolymer (SBS) or styrene-butadiene copolymer (SBR) compatible with the electrochemistry of the zinc-air battery cell assembly 100. In one embodiment, the grommet 130 can comprise, consist essentially of or consist of a polypropylene homo-polymer. Polyamide materials can also be used for the grommet 130 in some embodiments, and in other sealant applications, the material of the grommet 130 can also be a polyamide-based material such as Versamid (Huntsman Advanced Materials, The Woodlands, Tex.). In various embodiments, the mechanical design of a zinc-air battery cell assembly 100 can specify the style of sealant that is desirable for ensuring appropriate compatibility with an electrolyte of the anode material 140, the gasket material and the manufacturing methods used for application of the sealant.

The anode material 140 can be contained within the cavity 180 defined by the anode can 110 and cathode can 120, which in some examples can comprise, consist of, or consist essentially of zinc, aqueous potassium hydroxide, zinc oxide and gelling agents in an aqueous slurry. While a slurry anode material 140 is desirable in some embodiments, zinc-air battery cell assemblies 100 of some examples can be made using a poured anode process. Even distribution of the anode material 140 within the cavity 180 can be desirable in various embodiments.

In some embodiments, if a zinc-air battery cell assembly 100 is discharged at a low rate, high utilization may be required by the zinc-air battery cell assembly 100. In such embodiments, providing a significant void volume in the cavity 180 of the zinc-air battery cell assembly 100 can be desirable (e.g., 30% utilized). For example, FIG. 1 illustrates an example of a zinc-air battery cell assembly 100 having a void volume 181 in the cavity 180 of the zinc-air battery cell assembly 100 between the anode material 140 and a top end 111 of the anode can 110. In some embodiments, current density on the anode material 140 can be >60 mA/cm² for a high power drain, which in some examples can cause the zinc-air battery cell assembly 100 to achieve a zinc utilization of 50% or less.

In some embodiments, a 15% void volume 181 can be desirable, with the void volume 181 being defined as the amount of space remaining in the cavity 180 of the zinc-air battery cell assembly 100 aside from components such as the anode material 140, cathode material 150, and the like disposed within the cavity 180 in the assembled zinc-air battery cell assembly 100. In some embodiments, a desirable high-power capability is enabled in a zinc-air battery cell assembly 100 with a void volume 181 between 15-30% that generates a zinc utilization between 30% and 80%. In further embodiments, the void volume can be 5-40%, 10-35%, 20-25%, 10-20%, 5-25%, and the like.

In yet another aspect, the zinc-air battery cell assembly 100 can be configured to bulge, which can be as a result of expansion of the anode material 140 and/or cathode material 150 during a discharge reaction of the zinc-air battery cell assembly 100. For example, such bulging can occur in some embodiments during a high-power discharge reaction, which may include a power discharge of 50-135 mW/cm², 50-100 mW/cm², 50-75 mW/cm², 50-150 mW/cm², 75-135 mW/cm², 100-135 mW/cm², and the like.

Various embodiments relate to single use zinc-air battery cell assembly 100, where "single use" can be defined as a zinc-air battery cell assembly 100 configured for only being discharged once without the ability to re-charge the zinc-air battery cell assembly 100 after being discharged. For example, in various embodiments, a reaction that generates power can be a one-way reaction such that the reaction cannot be suitably reversed such that the zinc-air battery cell assembly 100 can be recharged. In various embodiments, this can be distinguished from a rechargeable battery that only has a limited recharging lifespan and the specific situation where such a battery is discharged for a final time and becomes inoperable.

In various embodiments, the zinc-air battery cell assembly 100 can be configured to bulge (e.g., increase its thickness at a maximum point) to at least between 5-25%, which in some examples can be defined as a volume displacement of the zinc-air battery cell assembly 100 from a normal configuration (e.g., as shown in FIG. 1, where the anode and cathode cans 110, 120 are generally planar on the top and bottom of the zinc-air battery cell assembly 100). For example, bulging of the zinc-air battery cell assembly 100 can include outward bulging of the top end 111 of the anode can 110 and/or outward bulging of the base 121.

In some examples, having the zinc-air battery cell assembly 100 configured to bulge to at least a certain amount can be defined as an amount of bulge that the zinc-air battery cell assembly 100 is able to sustain without being damaged, breaking, or the like, (e.g., where seals are broken, the anode and cathode cans 110, 120 break apart, contents within the zinc-air battery cell assembly 100 come out of the cavity 180, etc.). In some examples, having the zinc-air battery cell assembly 100 configured to bulge to at least a certain amount can be defined as an amount of bulge that the zinc-air battery cell assembly 100 is able to sustain while still being capable of returning to an original shape, (e.g., the anode and/or cathode cans 110, 120 can deform while bulging, but can return to an original configuration when bulging is not present). In further embodiments, the zinc-air battery cell assembly 100 can be configured to bulge an amount from 0-5%, 0-10%, 0-15%, 0-20%, 0-25%, 0-30%, 0-35%, 0-40%, 0-45%, 0-50%, and the like.

In some embodiments, expansion of contents within the cavity 180 (e.g., anode material 140 and/or cathode material 150), can result in a reduction of the void volume 181 in a zinc-air battery cell assembly 100, which in some examples can promote better anode consistency, connectivity with an anode current collector and an increase in overall anode capacity. Additionally, a void volume 181 in the cavity 180 can be desirable because it can allow for expansion of the contents within the cavity 180 (e.g., anode material 140 and/or cathode material 150), which in some examples may remove or reduce the amount of bulge that the zinc-air battery cell assembly 100 needs to accommodate. Accordingly, the volume of the void volume 181 can be configured based at least in part on an anticipated expansion of contents within the cavity 180 (e.g., anode material 140 and/or cathode material 150).

In various embodiments, a volume of anode material 140 to be present in the cavity 180 of the zinc-air battery cell assembly 100, and therefore the total weight of the anode material 140, can be determined initially based at least in part on the volume of the cavity 180 that will be generated in an assembled zinc-air battery cell assembly 100. Such a volume of the cavity 180 can be selected based at least in part on the mechanical design of the zinc-air battery cell assembly 100, and components thereof, and making appropriate allowances for the separator and its electrolyte absorption. In some specific embodiments, the anode material 140 can have a volume of 2.96 cc, or a volume between 3.0 and 2.9 cc, 3.5-2.5 cc, and the like.

The anode material 140 can be wet (e.g., have a high weight ratio of electrolyte:Zinc) in various examples, and in some examples, wetter than embodiments that run between 75-80% Zinc Weight %. Sealing can accommodate this in some embodiments. For example, in some embodiments the Zinc weight % can be between 60-70%, 60-66%, 55%-75%, 58%-%72%, or the like. Use of a zinc-air developed zinc powder from EverZinc (EverZinc Canada, Quebec, Canada) or Grillo (Grillo-Werke AG, Duisburg, Germany) is preferred in some embodiments, using zinc material used by Alkaline Button or Cylindrical Cell Company may be desirable in some examples. A caustic electrolyte containing potassium hydroxide can be used in some embodiments (e.g., 35% KOH and 2% ZnO, or a range of 33%-37%, 30-40% or 25-45% KOH and 1%-5%, 1%-4% or 1%-3% ZnO,).

In some embodiments the anode material 140 can comprise a slurry or gelled composition using sodium polyacrylate of polyacrylic acid as the gellant (e.g., Carbopol 940 NF Polymer, Lubrizol Corporation, Wickliffe, Ohio). The zinc weight % in the slurry can, in some such embodiments, be 64% to 74% or 62% to 74% for best results in some examples and the KOH concentration of the electrolyte can be between 33%-37%, 30-40% or 25-45%. The electrolyte of the anode material 140 may also contain zinc oxide and organic inhibitors in some embodiments, such as Polyethylene Glycol (PEG), Crown 18-6 or inorganic inhibitors such as indium hydroxide.

Carboxymethyl cellulose (CMC) can be used as an anode expander (e.g., in a poured anode process). High molecular weight, cross-linked polyacrylic acid polymers (e.g., Carbopol) can be used as an anode expander (e.g., in a slurry anode process). High (e.g., up to 2%) CMC content in the anode material 140 can help with cell wetness in some embodiments and the balance between the separator and CMC absorption of electrolyte can be tuned. In some embodiments, the type of zinc used in the anode material 140 can be an appropriate alloy with small amounts of zinc gassing inhibitors. For example, in some embodiments, individual alloying components can be less than 500 ppm and can include Indium, Bismuth calcium, aluminum, mercury, lead, or the like.

Packing density (e.g., particle-particle contact) can be an important variable in various embodiments. In some examples, a large diameter (e.g., greater than 500 microns) can produce problems such that a small cone of zinc becomes unreacted in the center of the zinc-air battery cell assembly 100. Distribution of the anode material 140 can be important in some embodiments, and if a poured anode material 140 is used, multiple pouring holes may be required in some examples. Alternatively, a method of manufacturing a zinc-air battery cell assembly 100 may employ a rotating fixture to ensure even filling of anode material 140 within the cavity 180 of the zinc-air battery cell assembly 100.

It can be desirable for gassing rates of the anode material 140 to be low in some embodiments (e.g., less than 0.5 $cm^3$ after 1 week at 60° C.). In various embodiments, contaminants can be managed in some or all components to current zero added mercury (Hg) zinc-air cells. Corrosion inhibitors can be dissolved in an electrolyte of the anode material 140 to reduce zinc gassing. Polyethylene Glycol (PEG) can be used for this purpose in some examples. Crown 18-6 (1,4,7,10,13,16-hexaoxacyclooctadecane) can be effective for reducing zinc gassing and can be added in some examples at a level of between 200-2500 ppm, 100-3500 ppm, 250-2000 ppm, 300-1500 ppm by weight of electrolyte, and the like. Note that as discussed herein, the terms "zinc corrosion" and "gassing," or the like, can be synonymous in various examples.

In various embodiments, zinc corrosion can be maintained at a low level. A corrosion rate at 60° C. of less than 0.2%/g/week or gas evolution rate of less than 0.04 microliter/g/week can be desirable in some examples. Higher corrosion/gassing rates in some embodiments can lead to leakage, cathode flooding, gas collection between the cathode and separator, gas collection between the separator and anode and/or ion impeding gas bubbles trapped in the zinc gel/slurry.

Various examples of aqueous alkaline batteries that have zinc anodes (e.g., anode material 140) can be configured to manage and control the corrosion of zinc that results in the production of hydrogen gas within the battery. While this can be undesirable in various types of batteries, a zinc-air battery cell assembly 100 in various embodiments can be particularly sensitive in some examples that have an open design and access to air. Problems that can result in some examples can include leakage, cathode flooding, separation of components and particularly deleterious for high power performance in some examples, the collection of gas bubbles within the anode material 140 that can lead to impedance and uniform zinc discharge issues.

Gassing management can be achieved in various embodiments by the use of alloying components in the zinc of anode material 140, a focus on material purity and/or by plating of an anode conductor. In addition, the use of an organic inhibitor can be added to an electrolyte of the anode material 140, and in some embodiments this can reduce the gassing reaction while at the same time not interfering with the battery discharge reaction. Many suitable types of inhibitors can be used in embodiments of aqueous alkaline batteries including Polyethylene Glycol, Non-ionic Alkyl and/or Aryl Phosphate surfactants, for example, RA-600, Sodium dodecylbenzenesulfonate, for example, Witconate and different Polyamines. Each of these chemicals in various examples may be able to dissolve in an alkaline electrolyte, may be chemically stable in a zinc-air battery cell assembly 100, may adsorb onto the zinc surface, but may not impede the electrochemical oxidation of the zinc or the distribution of oxy-zinc products.

This disclosure in one aspect relates to a series of organic ring molecules called, Crown Ethers that can act as complexing agents in various embodiments and may be able, depending on their structure, to trap different cations. In one preferred embodiment, 0.2 weight percent of 18-Crown-6 is added to an alkaline electrolyte, while further embodiments can include 0.15-0.25 or 0.1-0.3 weight percent of 18-Crown-6. Tests of an implementation having 0.2 weight percent of 18-Crown-6 show that at this level, zinc corrosion of the zinc-air battery cell assembly 100 can be reduced versus other inhibitors and that the high-power performance is improved. 18-Crown-6 can be best for potassium-based alkaline electrolytes in some examples, but other Crown-style inhibitors can have efficacy and moreover can, in some examples, be better suited for sodium or lithium hydroxide systems or electro-chemistries that have a different anode than zinc.

The following Crown Ethers can be used in some embodiments and an electrolyte concentration of between 0.05 weight % and 0.5 weight % can be desirable in various examples: 18-Crown-6, 15-Crown-5, 12-Crown-4, Diaza-18-Crown-6, Di-Benzo-18 Crown-6, Diazacrowns, Cryptands, Azo-Crowns, Lariats, and the like. Some embodiments can have an electrolyte concentration of between 0.05-0.5 weight %, 0.05-1.0 weight %, 0.05-1.5 weight %, 0.1-0.45 weight %, 0.15-0.40 weight %, 0.2-0.35 weight %, 0.25-0.30 weight %, and the like.

Located between the anode material 140 and the cathode material 150 can be a separator 190, which in some examples can act as both an electronic insulator and an ion conductive path. In various embodiments, a separator 190 in a zinc-air battery cell assembly 100 (e.g., a high-power single-use zinc-air battery) can provide electronic insulation between the anode material 140 and the cathode material 150, but at the same time, provide for low resistance ionic conduction. The balancing act between the two may not be easy to achieve in various examples, and for a zinc-air battery cell assembly 100, in various embodiments it can be desirable for the separator to have the added property of reducing and managing the transfer of Oxygen ($O_2$), Water vapor ($H_2O$) and/or Carbon Dioxide ($CO_2$). This can be important for some example applications of a zinc-air battery cell assembly 100 that can have run times measured in days, weeks or even months as both $O_2$ and $CO_2$ may pass through the separator 190 and may degrade the zinc and electrolyte of the anode material 110 given enough time.

Separators for high power and/or low power batteries may not need low wet ionic resistance to deliver the required level of performance and such separators may be characterized by small pore size to minimize gas transfer. For example, a zinc-air battery cell assembly 100 in some examples can comprise one or more separators having pore sizes less than 1 micron and wet ionic resistances of higher than 50 mohm·$cm^2$. In some embodiments, a separator can have a pore size of less than 10, 9, 8, 7, 6, 5, 4, 3, 2, 1, 0.75, 0.5, 0.25 microns, or the like. In some embodiments, a separator can have wet ionic resistances of higher than 100 mohm·$cm^2$, 75 mohm·$cm^2$, 50 mohm·$cm^2$, 25 mohm·$cm^2$, and the like.

In some examples of a high-power zinc-air battery cell assembly 100, such as a cell phone charger, the zinc-air battery cell assembly 100 can deliver practical energy between 1-10 hours which may be insufficient time for deleterious gas transfer across the separator 190 to cause an unacceptable decrease in the performance of the zinc-air battery cell assembly 100. It is therefore possible, in some embodiments, for such an application to open up the pore size and/or increase the overall porosity of the separator 190, which can generate a benefit from a reduced wet ionic resistance without causing an unacceptable decrease in the performance of the zinc-air battery cell assembly 100 due to gas transfer across the separator 190 given expected operation time and/or one-use nature of such a zinc-air battery cell assembly 100.

An implementation of one example embodiment of a zinc-air battery cell assembly 100 a separator 190 included two layers of a PVA-Cellulosic separator supplied by SWM (Schweitzer-Maudit International). This material had the following properties: Basis Weight: 20.5 g/m$^2$; Thickness: 60-70 microns; Absorption: 115 g/m$^2$; Mean Pore Size: 2.20 microns; and Maximum Pore Size: 9.80 microns. When this configuration was tested in a zinc-air battery cell assembly 100 at a rate of 70 mW/cm$^2$, the example separator 190 in this example embodiment outperformed separators 190 with smaller pore size and higher wet ionic resistance.

One preferred embodiment can include a separator 190 comprising PVA fibers blended with synthetic or natural cellulose using the dry-laid or wet-laid process. Surfactants can also be added to improve the properties of the separator. Other separator compositions can include: Polyolefin, Polyamide, Polyester, Polysulfone and Wood Pulp.

In various embodiments, high power can be maximized for a zinc-air battery cell assembly 100 without deleterious gas transfer across the separator 190 when the mean pore size is between 1 and 10 microns and when the wet ionic resistance for the separator system (e.g., one or more layers) is less than 50 mohm·cm$^2$. Some embodiments can have a mean pore size between 1 and 20 microns, between 1 and 15 microns, between 1 and 5 microns, and the like. In some embodiments, wet ionic resistance can be less than or equal to 100 mohm·cm$^2$, 75 mohm·cm$^2$, 50 mohm·cm$^2$, 25 mohm·cm$^2$, and the like.

The cathode material 150 can be in direct contact with the cathode can 120 and can be comprised of a carbon-polymer composite in some examples. In some examples, a metal oxide catalyst can be added to the cathode material 150 to aid an oxygen reduction reaction. Located within the area between the planar base 121 of the cathode can 120 containing the air access holes 160 and a planar rim 122 in contact with the cathode material 150 can be an air diffusion member 170. This air diffusion member 170 can be a primary means of conduction of electrical charge between the cathode material 150 and the cathode can 120 in various embodiments. The air diffusion member 170 in some examples can be made of various suitable materials such as a carbon foam, carbon felt, carbon paper material, or the like. In some embodiments, the conductive diffusion member 170 can have a porosity of greater than 60% and an electronic resistivity of less than 20 mohm-cm. In some embodiments, the conductive diffusion member 170 can have a porosity or open area of greater than 40%, 45%, 50%, 55%, 60%, 65%, 70%, the like.

While some examples can include non-woven diffusion member 170, some embodiments can comprise a diffusion member 170, a nickel mesh diffusion pad 170 (e.g., a nickel mesh diffusion pad is used instead of a non-woven diffusion pad). Such embodiments can provide desirable contact between the cathode material 150 and the cathode can 120 across the entire or a large portion of the surface area of the cathode material 150. Some embodiments can comprise several (e.g., 4, 6, 8, 10, or the like) spot welds or laser welds to ensure good electrical contact with the cathode can 120. In various examples, it can be desirable for a nickel diffusion pad to not interfere with air flow and/or be chemically reactive with composition of the zinc-air battery cell assembly 100.

In various examples, it can be desirable for the anode can 110 to not promote excessive zinc gassing when in contact with zinc and electrolyte that may comprise the anode material 140. Accordingly, in some embodiments, it can be desirable for metal components such as the anode can 110 and/or cathode can 120 to comprise pure copper, brass, tin or indium plating, or the like. For example, tin plating the whole of the anode can 110 can be present in some embodiments. Various examples can include welding to or cladding with tin plate.

One aspect of the present disclosure includes an air cathode assembly that can comprise, consist of, or consist essentially of a multiple layer assembly (e.g., 0.4 mm+/− 0.04 mm thick), which can be circular in shape with a diameter corresponding to the size of a cathode can 120 as discussed herein.

Figure 2:
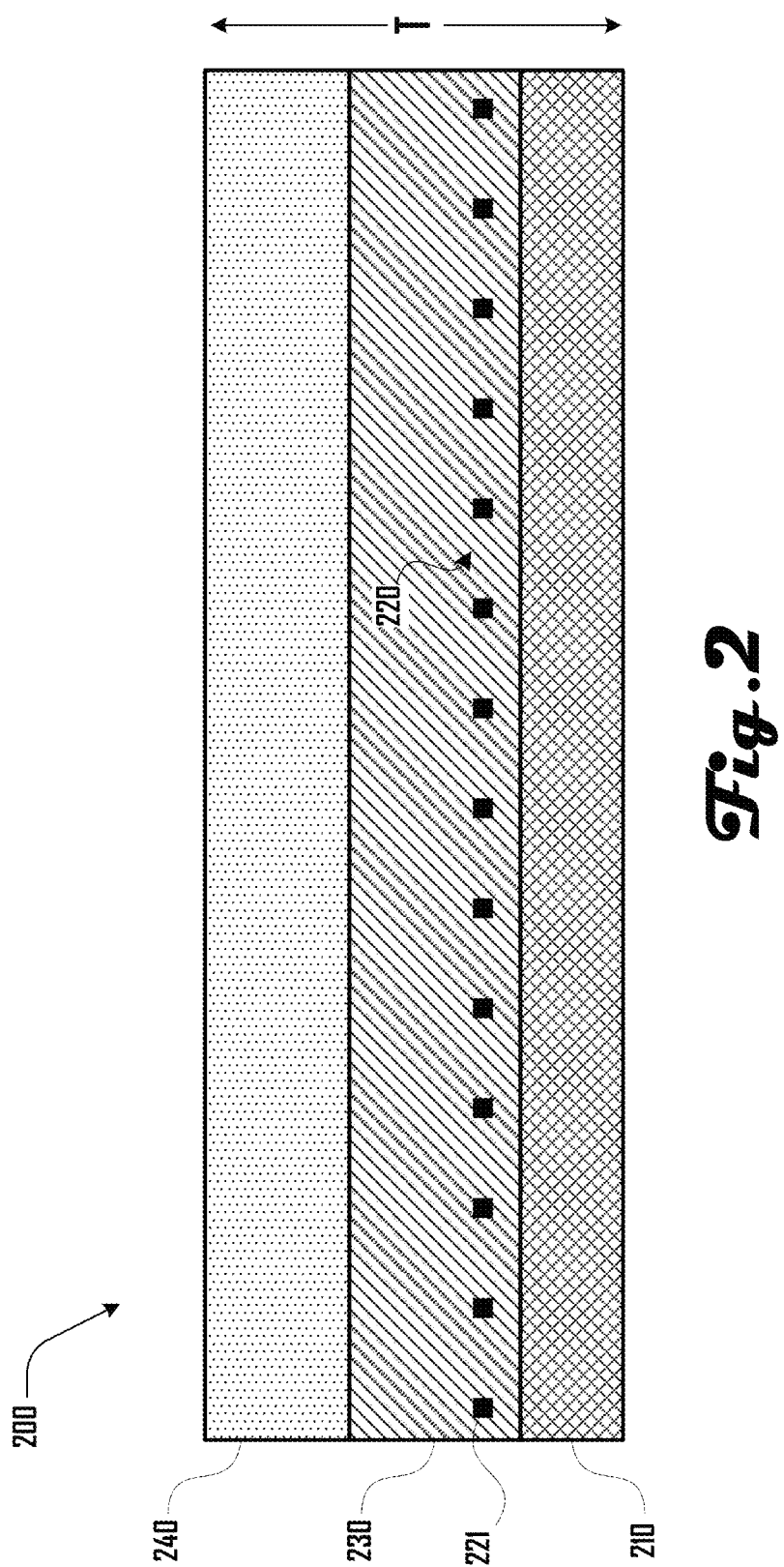
FIG. 2 illustrates a cross-sectional view of an example of an air cathode assembly in accordance with one embodiment, which includes a first conductive layer, a grid disposed in a second air cathode layer and a third separator layer.

FIG. 2 illustrates a cross-sectional view of an example of an air cathode assembly 200 in accordance with one embodiment, which can comprise, consist of, or consist essentially of a first conductive cathode diffusion layer 210, a grid 220 disposed in a second active air cathode layer 230 and a third separator layer 240. In the example of FIG. 2, the second active air cathode layer 230 is sandwiched between, directly adjacent to and bonded to the first conductive cathode diffusion layer 210 and the third separator layer 240, without any intervening layers.

In various examples, first conductive cathode diffusion layer 210 can comprise, consist of, or consist essentially of a conductive microporous polymer layer bonded to the second active air cathode layer 230. In some embodiments, the first conductive cathode diffusion layer 210 can comprise a carbon containing polytetrafluoroethylene (PTFE). Electronic conduction in both layer 210 and layer 230 can be into and out of the plane. In some embodiments, the thickness of the conductive cathode diffusion layer 210 can be between 0.1 and 0.3 mm. In some embodiments the thickness of the active air cathode layer 230 can be between 0.2 and 0.6 mm.

In various examples, the grid 220 can comprise, consist of, or consist essentially of a nickel mesh that may or may not be coated with carbon or graphite paint (e.g., coated with Timrex Graphite and/or Dispersions, Imerys Graphite & Carbon Switzerland SA or coated with Acheson graphite paint, or the like). In some embodiments, the grid 220 may or may not be coated with carbon or graphite paint and fixed to the inside of a cathode can 120 with a conductive glue such as MG Chemicals Super Silver Epoxy adhesive, spot welding, laser welding, or the like.

The grid 220 can be embedded into the second active air cathode layer 230 and can provide stability and high-power performance consistency in some examples. In various embodiments, the grid 220 can be defined by a plurality of elongated grid elements 221 disposed in a plurality of parallel rows and parallel columns, with the rows and columns being perpendicular to each other and engaging at a plurality of intersections. For example, FIG. 2 illustrates a cross-section with a plurality of grid elements 221 disposed in parallel and embedded in the second active air cathode layer 230. As shown in FIG. 2, the grid 220 can be planar with a plane of the grid 220 being parallel to respective planes of contact between the active air cathode layer 230 and the conductive cathode diffusion layer 210 and the separator 240. In some embodiments, the grid elements 221 can comprise nickel, nickel alloys, nickel plated steel, and the like. In some embodiments, thickness of grid elements can be 0.05-0.25 mm. Distance between grid elements can be expressed as % open area and can be 60% to 90% in some examples.

Additionally, as shown in the example of FIG. 2, the grid 220 can be disposed within the second active air cathode layer 230 proximate to the conductive cathode diffusion layer 210 or disposed closer to the conductive cathode diffusion layer 210 compared to the separator layer 240. In other words, the second active air cathode layer 230 can have a central plane and the grid 220 can be disposed within the second active air cathode layer 230 on one side of the central plane closer to the conductive cathode diffusion layer 210. In some embodiments, the grid 220 can be flush with the conductive cathode diffusion layer 210. For example, the grid 220 can be disposed at an external edge of the second active air cathode layer 230 such that the grid 220 can engage with or directly abut the conductive cathode diffusion layer 210.

The size, position and configuration of the grid 220 illustrated in FIG. 2 is provided as one example; however, in further embodiments the grid 220 can have any suitable size, configuration or position relative to layers 210 and 240. For example, in some embodiments, the grid 220 can comprise a plurality of circular rings of various diameters with a plurality of radial grid elements extending radially from a central location of the grid. Also, while an example of a grid 220 defining square or rectangular spaces between rows and columns of grid elements 221, further embodiments can include a grid 220 including spaces of one or more suitable shape, including triangular, pentagonal, hexagonal, heptagonal, octagonal, or the like. Additionally, grid elements 221 may not be linear or elongated in various embodiments.

In some embodiments, the grid 220 may or may not provide an electric conduction and connection through its circumference to the cathode can 120 of the zinc-air battery cell assembly 100 (see, e.g., FIG. 1) that the cathode assembly 200 is disposed in. For example, in some embodiments, one or more ends of grid elements 221 can engage the cathode can 120 of a zinc-air battery cell assembly 100 to generate an electrical connection between the grid 220 and the cathode can 120 of the zinc-air battery cell assembly 100. In further examples, the grid 220 can comprise a peripheral rim or other suitable element that allows the grid 220 to engage with and have an electrical connection with the cathode can 120 of the zinc-air battery cell assembly 100. However, it should be clear that in various embodiments, electrical and/or physical contact (e.g., radially) between the grid 220 and cathode can 120 is specifically absent.

In some embodiments an electrical connection between the active air cathode layer 230 and the cathode can 120 can be provided by a conductive carbon disk (e.g., conductive diffusion member 170). In some embodiments, such a conductive disc can comprise a felt, a foam or a paper. Such a conductive disc in some examples can have a thickness between 0.1 mm and 0.25 mm and can have a resistivity of less than 20 mohm·cm². Preferably, in some embodiments, the thickness of the conductive disc can be between 0.1 and 0.25 mm and the conductivity can be between 5 and 15 mohm·cm². The conductive disk may be held in place by pressure between the cathode assembly 200 or the cathode material 150 and the cathode can 120, by adhesive, or the like.

In various embodiments, the second active air cathode layer 230 can be pressed together to form a contiguous cathode strip and can then be pressed onto a grid 220 such that the grid 220 is embedded in the second active air cathode layer 230. In some examples, the second active air cathode layer 230 can comprise high-conductivity carbons and/or high-surface-area carbons, and finely dispersed manganese dioxide all mixed together with a dispersion of polytetrafluoroethylene (PTFE) in water. Other methods may use the permanganate method where the carbon is washed with a permanganate solution and then dried in an oven to produce the manganese oxide catalyst.

In various embodiments, the third separator layer 240 can comprise a 25 μm microporous monolayer polypropylene membrane that is laminated to a polypropylene nonwoven fabric and surfactant coated to a total thickness of about 110 μm. For example, some embodiments of the third separator layer 240 can comprise Celgard 5550 (Celgard, LLC, Charlotte, N.C.). In some examples, the separator layer 240 can be glued onto the second active air cathode layer 230 using various suitable adhesives such as a polyvinyl alcohol (PVA) or polyacrylic acid (PAA) based glue, or the like. Carboxymethyl cellulose (CMC) may be included as a component of the separator layer 240. In some embodiments, pre-wetting of the separator 240 can be desirable.

In various embodiments, the separator layer 240 serves to maximize ionic conduction (e.g., and minimize ionic resistance) and can provide electronic insulation between the anode and the cathode. Ionic conduction in aqueous batteries can be enabled by separator porosity and the presence of conducting electrolyte within the separator pores. In some embodiments, porosity of the separator layer 240 can be between 75% and 90%. Shorting or puncture resistance can also be important in some examples. In various embodiments, it can be important that the anode and cathode never touch; even when the cell is fresh or during discharge when the anode and cathode expand and the separator is squeezed between them and when semi-conducting solids can deposit in the pores of the separator layer 240. Factors that can be important in some examples can be the separator thickness, separator tortuosity and separator mechanical integrity.

In some examples, a cathode assembly 200 can have a total thicknesses T of between 0.3 mm and 0.7 mm, and in some embodiments preferably less than 0.45 mm. Further embodiments can include a cathode assembly 200 having a thickness between 0.1 mm and 0.9 mm, 0.2 mm and 0.8 mm, 0.4 mm and 0.6 mm, 0.5 mm and 0.2 mm, 0.5 mm and 0.3 mm, 0.5 mm and 0.4 mm, or the like.

In some examples, such an air cathode assembly 200 embodied in a zinc-air battery cell assembly 100 (or other embodiments of a zinc-air battery cell assembly 100 discussed herein) can have a minimum continuous power capability of 60 mW/cm², 70 mW/cm², 80 mW/cm², 90 mW/cm², 100 mW/cm², 110 mW/cm², 120 mW/cm², 130 mW/cm², 135 mW/cm² 140 mW/cm², 150 mW/cm², and the like.

It should be noted that the examples of FIGS. 1 and 2 can be suitably combined in various ways and that the elements of one given example should not be considered to be exclusive to that illustrative embodiment. For example, in on embodiment, the cathode material 150 of FIG. 1 can comprise, consist of or consist essentially of an active air cathode layer 230 and the conductive cathode diffusion layer 210 of FIG. 2. Accordingly, various suitable elements of FIGS. 1 and 2 should be considered interchangeable, or may be specifically absent in some embodiments. For example, the cathode material 150 of FIG. 1 can be interchangeable with the combined active air cathode layer 230 and conductive cathode diffusion layer 210 of FIG. 2. In another example, the third separator layer 240 of FIG. 2 can be interchangeable with the separator 190 of FIG. 1. In a further example the cathode assembly 200 of FIG. 2 (having an air cathode layer 230, conductive cathode diffusion layer 210 and separator layer 240), can be interchangeable with the cathode material 150 and separator 190 of FIG. 1.

Figure 3:
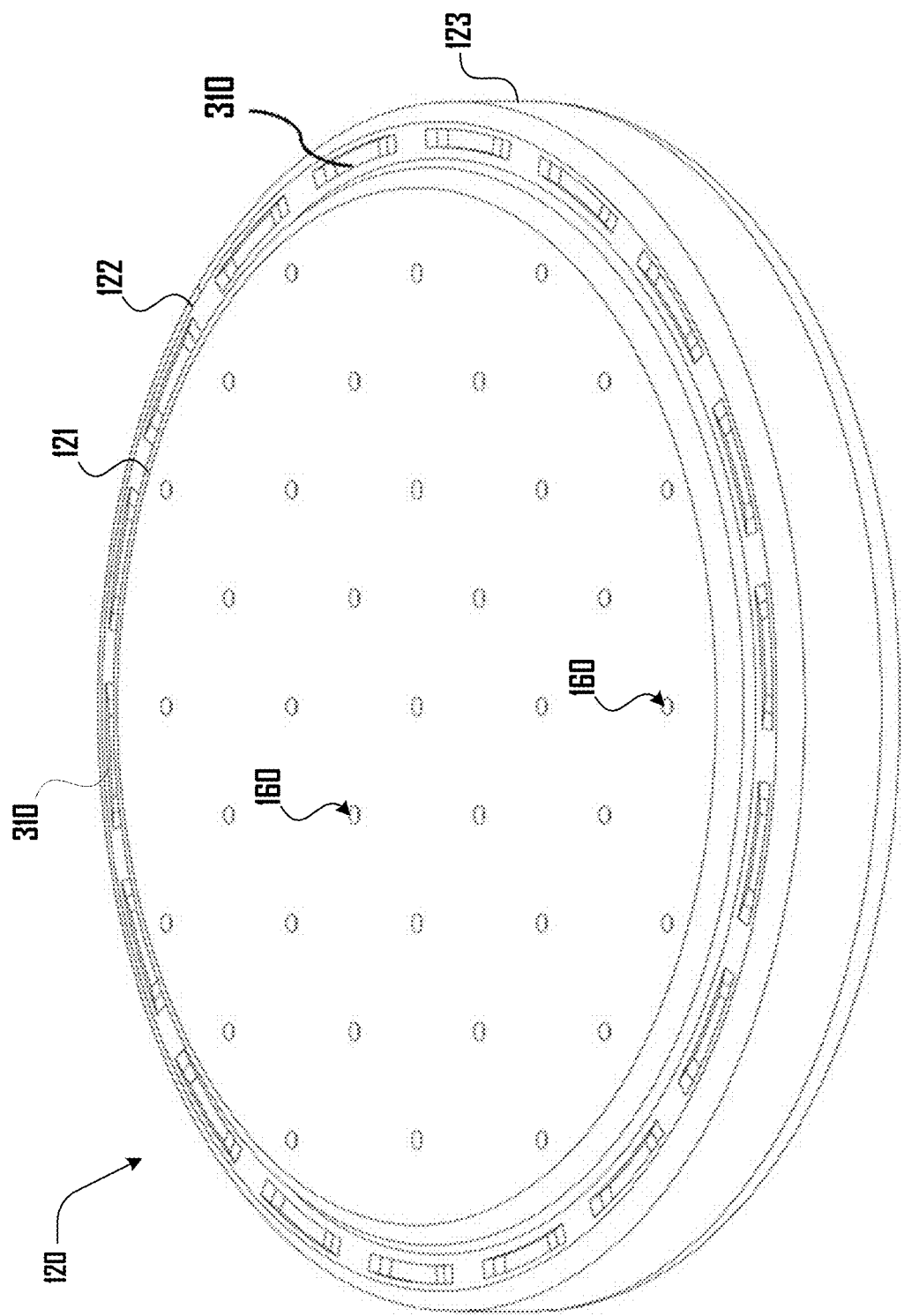
FIG. 3 illustrates a bottom perspective view of a cathode can of one embodiment.
Figure 4:
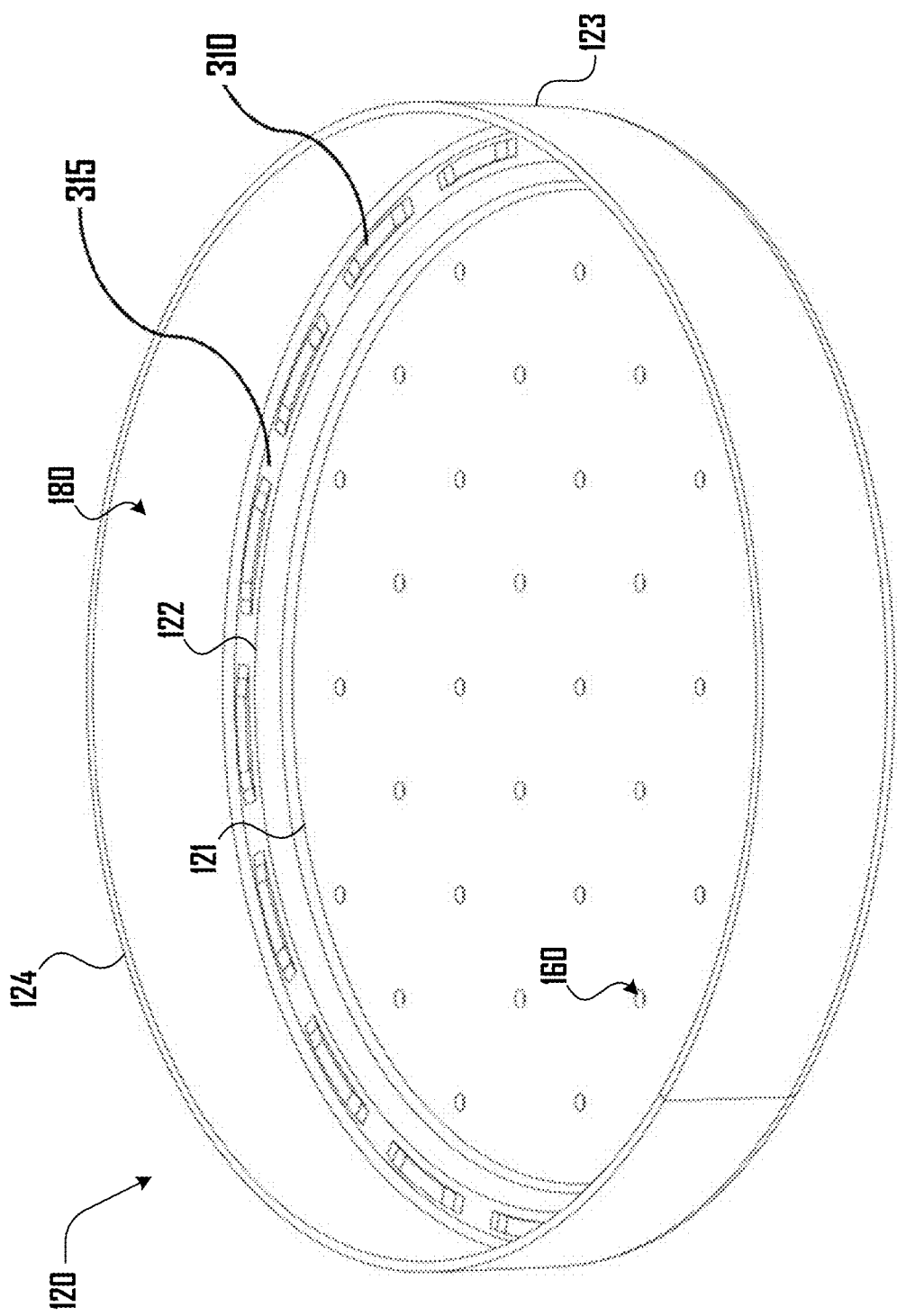
FIG. 4 illustrates a top internal perspective view of a cathode can of one embodiment.
Figure 5:
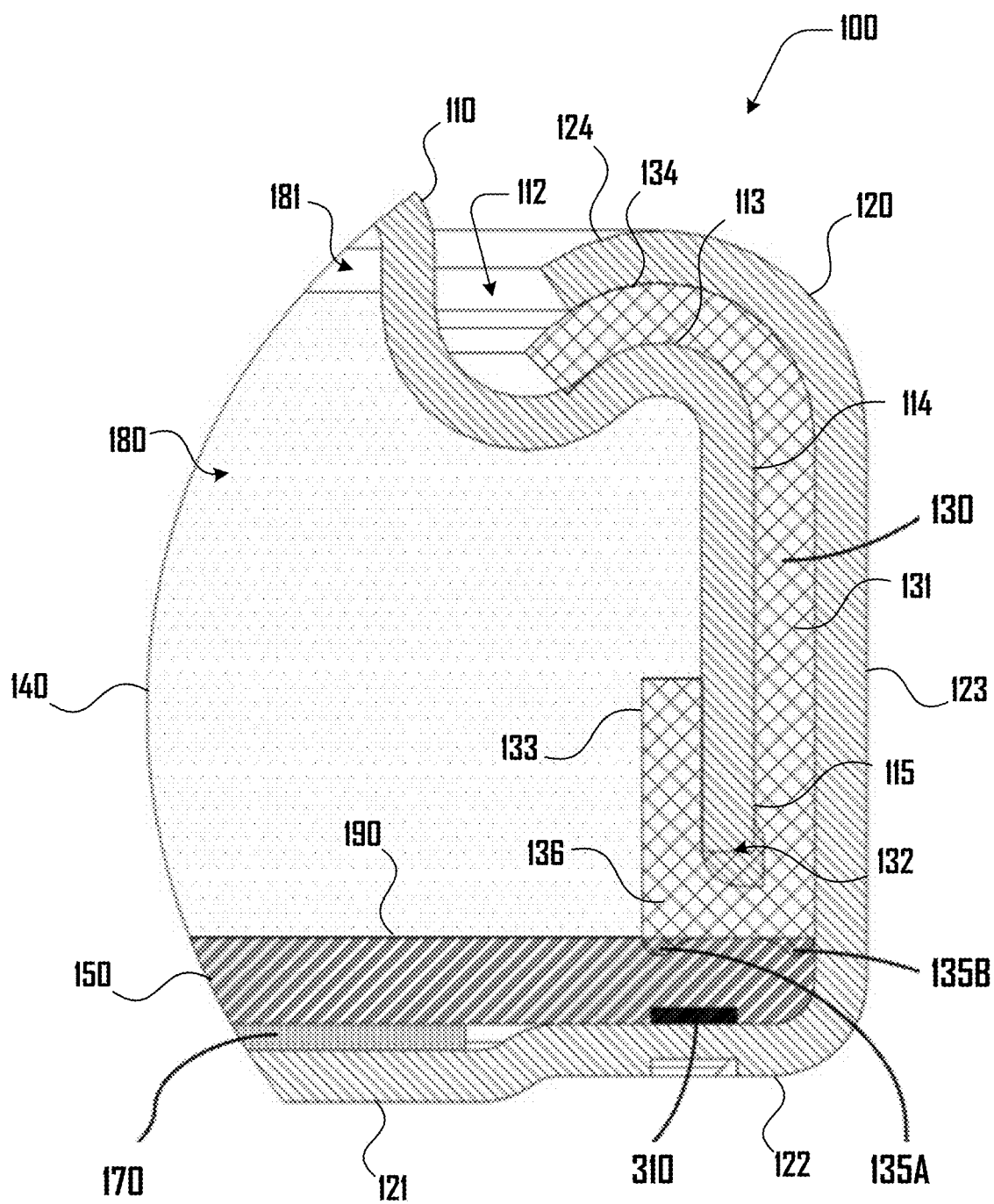
FIG. 5 illustrates an example cross-sectional view of a side portion of a zinc-air battery cell assembly.

Turning to FIGS. 3-5, various embodiments can make use of a series of protrusions 310 formed into the planar rim 122 of the cathode can 120 that can be in contact with the cathode material 150 such as shown in FIG. 5. As shown in the example of FIGS. 3 and 4, these protrusions 310 can be formed in a circular pattern about the central axis of the cathode can 120 with the protrusions 310 located on the planar rim 122 and extending into the cavity 180 of the cathode can 120. For example, in some embodiments, the protrusions 310 can be formed in a cathode can 120 by stamping the protrusions into the planar rim 122 such that the protrusions 310 extend into the cavity 180 of the cathode can 120 as shown in FIG. 4, and leave a protrusion slot on the external side of the planar rim 122 of the cathode can 120 as shown in FIG. 3.

The size, shape and count of these protrusions 310 are not restricted by the present disclosure and the specific example embodiments shown and described should not be construed to be limiting. In some examples, such as shown in FIGS. 3 and 4, the cathode can 120 can comprise 18 protrusions 310 with a protrusion height between 0.05-0.15 mm and a protrusion width between 0.5 and 1.50 mm and a length between 3.0 and 5.0 mm, having a generally rectangular cross-section and stepping up to a maximum protrusion height from opposing ends of the protrusion. In some embodiments, protrusions 310 can be spaced apart by 1.5 mm+/−0.2 mm).

Further embodiments can have a protrusion height from the face of the planar rim 122 of 0.05-0.25, 0.05-0.20, 0.05-0.15, 0.05-0.10, 0.10-0.15 mm and the like. Some embodiments can have a protrusion width between 0.5 and 2.00 mm, 0.5 and 1.50 mm, 0.5 and 1.00 mm, 1.0 and 1.50 mm, and the like. Some embodiments can have a protrusion length between 1.0 and 7.0 mm, 2.0 and 6.0 mm, 3.0 and 5.0 mm, 4.0 and 6.0 mm, 2.0 and 4.0 mm, and the like. Protrusions 310 can be spaced apart by 1.4-1.6 mm, 1.3-1.7 mm, 1.2-1.8 mm, 1.1-1.9 mm, 1-2 mm, and the like. Various embodiments can include any suitable number of protrusions, including 2, 4, 6, 8, 10, 12, 14, 16, 18, 20, 22, 24, 26, 28, 30, 32, 34, 36, 38, 40, 45, 50, 75, 100, 125, 150, 200, and the like. Also, while the examples of FIGS. 3 and 4 illustrate protrusions 310 that are the same size and shape and spaced apart the same amount, further embodiments can including protrusions 310 that are different shapes and/or sizes, which may or may not be spaced apart different amounts.

The dimensions and configuration of protrusions 310 in further embodiments can be based upon the size, shape and configuration of the zinc-air battery cell assembly 100. In various embodiments, upon closure of the zinc-air battery cell assembly 100 as discussed herein, the protrusions 310 penetrate the cathode material 150 and make contact with a metal screen mesh (e.g., grid 220) embedded inside the cathode material 150, which can generate a permanent and secure contact between the metal screen mesh and the cathode can 120. The penetration of the protrusions 310 into the cathode material 150 can, in various examples, place the cathode material 150 under increased compression, which can provide for better sealing between the cathode can 120 and cathode material 150. In some embodiments, a portion of the cathode material 150 compressed by the protrusions 310 flows into the areas 315 between the protrusions 310, which can increase the volumetric amount of cathode material 150 in those areas 315 which can increase the pressure on the cathode material 150 to an amount similar to the pressure on the cathode material 150 in areas of the cathode material 150 compressed by protrusions 310. Another aspect of the protrusions 310 can be to put increased pressure on the cathode material 150 which can provide for better sealing between a grommet 130 (see FIGS. 1 and 5) and the cathode material 150.

As shown in FIG. 5, anode can 110 can comprise a planar top end 111 (see FIG. 1) that peripherally curves downward to define a slot 112 with a ridge 113, that extends to an elongated anode sidewall 114, which extends perpendicular to the planar top end 111 of the anode can 110. The cathode can 120 can comprise an elongated cathode sidewall 123 that extends perpendicular to the planar base 121 and planar rim 122 of the cathode can 120. The anode can 110 can be configured to be disposed within the cathode can 120 with the anode and cathode sidewalls 114, 123 being disposed in parallel and adjacent as shown in the example of FIG. 5.

In various embodiments, the zinc-air battery cell assembly 100 can comprise a grommet 130 that provides a seal between the anode can 110 and the cathode can 120 while also keeping the anode can 110 and cathode can 120 physically and electrically separate. For example, as shown in the example of FIG. 5, the grommet 130 can surround an end 115 of the anode sidewall 114 with a first elongated portion 131 of the grommet 130 being disposed between the anode and cathode sidewalls 114, 123. The end 115 of the anode sidewall 114 can be disposed within a grommet slot 132, with a second elongated portion 133 of the grommet 130 extending along an internal portion of the anode sidewall 114 with the first and second elongated portions 131, 133 being coupled via bridge portion 136 that defines a portion of the grommet slot 132.

An end 134 of the first elongated portion 131 can be configured to extend over the ridge 113 and into the slot 112 of the anode can 110. For example, as discussed in more detail herein, an end 124 of the cathode sidewall 123 can be crimped to the configuration shown in FIG. 5, where the end 124 of the cathode sidewall 123 curls over the ridge 113 and slot 112 (compared to the configuration of the end 124 of the cathode sidewall 123 shown in FIG. 4). As discussed in more detail herein, such crimping of the end 124 of the cathode sidewall 123 can create a seal between the anode can 110 and cathode can 120 via the grommet 130.

In various embodiments, the grommet 130 can further comprise feet 135A, 135B, that can compress against the cathode material 150 and/or separator 190, which can provide increased leakage protection for the zinc-air battery cell assembly 100. For example, the feet 135A, 135B can provide an improved seal between the anode can 110 and cathode can 120 such that contents within the cavity 180 of the zinc-air battery cell assembly 100 such as the anode material 140 and/or cathode material 150 is prevented from leaking out from between the anode can 110 and cathode can 120, even where anode material 140 and/or cathode material 150 expands within the cavity 180 as discussed herein.

As shown in the example of FIG. 5, a first foot 135A can be present at a peripheral edge of the bridge portion 136 of the grommet 130 proximate to the second elongated portion 133 and the second foot 135B can be present on an opposing peripheral edge of the bridge portion 136 proximate to the first elongated portion 131. The feet 135A, 135B can be various suitable sizes and shapes. For example, in some embodiments, the feet 135A, 135B can be generally the same width as the first and second elongated portions 131, 133 and spaced apart the thickness of the anode sidewall 114.

In various embodiments, compression of the grommet 130 and the feet 135A, 135B into the cathode material 150 and/or separator 190 can be generated by the application of a downward force of the anode can 110 into the grommet 130, which in some examples can be caused by a closure process of the zinc-air battery cell assembly 100 such as crimping of the end 124 of the cathode sidewall 123 to create a seal between the anode can 110 and cathode can 120 via the grommet 130 as discussed herein.

The feet 135A, 135B can provide an increased compressive force between the grommet 130 and the cathode material 150 and/or separator 190. A first area of higher compression generated by the first foot 135A can, for example, act as a dam blocking the movement of electrolyte from the anode material 140 area across the interface between the cathode material 150 and/or separator 190 and grommet 130. The area of the bridge portion 136 between the feet 135A, 135B can be under compression, which can provide an additional tortuous path blocking the flow of electrolyte from the anode material 140 area across the interface between the cathode material 150 and/or separator 190 and grommet 130. A second area of higher compression generated by the second foot 135B can act as a sealing surface, which can further block the movement of any electrolyte from the anode material 140 across the interface between the cathode material 150 and/or separator 190 and grommet 130. The use of not allowed to leak from the zinc air battery cell assembly 100. Accordingly, the novel configuration of the feet 135A, 135B of the grommet 130 in various embodiments cannot be considered a mere design choice given the improved sealing that can be generated by specific configurations of the feet 135A, 135B.

In some embodiments, a crimped zinc-air battery assembly 100 can tolerate at least 50 psi internal pressure (e.g., generated by expansion of the anode material 140 and/or cathode material 150) without opening of a crimping of the end 124 of the cathode sidewall 123 that creates a seal between the anode can 110 and cathode can 120 via the grommet 130 and/or pressure that will force the force electrolyte into the cathode and cause failure of the zinc-air battery assembly 100. Further embodiments can be configured to tolerate at least 10 psi, 20 psi, 30 psi, 40 psi, 50 psi, 60 psi, 70 psi, 80 psi, 90 psi, 100 psi, 110 psi, 120 psi, 130 psi, 140 psi, 150 psi, and the like. Various examples of a zinc-air battery assembly 100 do not have any pressure build up under normal temperature of use and storage up to 45° C. because, in some embodiments, hydrogen can permeate through the cathode material 150 easily. In some embodiments, a zinc-air battery assembly 100 does not have any pressure build up under normal temperature of use and storage up to 30° C., 35° C., 40° C., 45° C., 50° C., 55° C., 60° C., 65° C., 70° C., and the like.

For many applications, the zinc-air battery assembly 100 of various embodiments offers the longest run time of any primary aqueous battery system with flat discharge voltage, safety and low cost. However, when in use in various examples, a zinc-air battery assembly 100 can be open to the ambient atmosphere; therefore, the zinc-air battery assembly 100 may not be independent of environmental conditions. Drying out in low humidity conditions in some examples can limit life once opened to the air.

Flooding of a zinc-air battery assembly 100 in a high humidity environment can limit power output and activated life of the zinc-air battery assembly 100 in some examples. Air access management can therefore be an important feature for zinc-air battery assemblies 100 in some embodiments. Therefore, air holes 160 in some examples can be designed to meet a minimum 50 mW/cm$^2$ discharge and activated life requirement of 24 hours. For example, in one embodiment, the number of holes 160 defined by the cathode can 120 of a zinc-air battery assembly 100 can be over 5 per cm$^2$ and the hole diameter can be equal or greater than 0.5 mm and the holes 160 can be arranged in a pattern so that no hole 160 is further than 5 mm from the hole 160 closest to it or from the edge of the air cathode.

In some embodiments, the number of holes 160 defined by the cathode can 120 of a zinc-air battery assembly 100 can be over 1 per cm$^2$, 2 per cm$^2$, 3 per cm$^2$, 4 per cm$^2$, 5 per cm$^2$, 6 per cm$^2$, 7 per cm$^2$, 8 per cm$^2$, 9 per cm$^2$, 10 per cm$^2$, 15 per cm$^2$, 20 per cm$^2$, and the like. In some embodiments, hole diameter can be greater than 0.1 mm, 0.2 mm, 0.3 mm, 0.4 mm, 0.5 mm, 0.6 mm, 0.7 mm, 0.8 mm, 0.9 mm, 1.0 mm, and the like. In some embodiments, hole diameter can be between 0.1 mm and 1.0 mm, 0.2 mm and 0.9 mm, 0.3 mm and 0.8 mm, 0.4 mm and 0.7 mm, 0.5 mm and 0.6 mm, and the like. In some embodiments, holes 160 can be arranged in a pattern so that no hole 160 is further than, 1 mm, 2 mm, 3 mm, 4 mm, 5 mm, 6 mm, 7 mm, 8 mm, 9 mm, 10 mm, or the like, from the hole 160 closest to it and/or from the edge of the air cathode can 120.

Regulation can be desirable in various embodiments because other gases, like hydrogen, water vapor and carbon dioxide can enter or leave the cavity 180 of the zinc-air battery assembly 100. If not properly controlled, in some examples, undesirable gas transfer can cause performance degradation including degradation of service life of the zinc-air battery assembly 100. Water vapor transfer can be the dominant form of gas transfer that can result in performance degradation in some examples. This transfer of water vapor can occur in various examples when electrolyte and the ambient relative humidity are not equal.

In some embodiments, the electrolyte of a zinc-air battery assembly 100 can be in equilibrium with the ambient room temperature when relative humidity is approximately 55%. Accordingly, in some conditions such a zinc-air battery assembly 100 can lose water on drier days and gain water on more humid days. In some examples, water gain or water loss can cause the zinc-air battery assembly 100 to fail before delivering the intended performance. Smaller and more evenly distributed holes 160 in the zinc-air battery assembly 100 can slow down the exchange in some examples. Another measure to increase tolerance can be making sure that the tortuous path in the cathode diffusion layer is adequate.

In some examples, a zinc anode material 140 can be a porous structure of granulated powder in mix with electrolyte and a gelling agent. Metal cathode and anode cans 110, 120 for housing cathode and anode active materials 140, 150 can also act as the terminals with a plastic gasket (e.g., grommet 130) in between to insulate.

In various embodiments, a portion of the total volume of the cavity 180 of a zinc-air battery assembly 100 can be a void volume 181 reserved to accommodate the expansion that occurs when zinc is converted to zinc oxide during power discharge of the zinc-air battery assembly 100. This void volume 181, (e.g., 15% to 25% of the total volume of the cavity 180), can provide additional tolerance to sustained water gain during high humidity operating conditions. For example, some embodiments can include an initial void volume 181 within the available volume of the cavity 180 of 15%, 18%, 21%, 23%, 25%, or the like, to accommodate this. In further embodiments, the void volume 181 can be 14-16%, 17-19%, 20-22%, 22-24%, 24-26%, 5-40%, 10-35%, 20-25%, 10-20%, 5-25%, and the like. In some embodiments, the void volume 181 can be 0.5-5.5 cc, 1.0-5.0 cc, 1.5-4.5 cc, 2.0-4.0 cc, 2.5-3.5 cc, 2.0-3.0 cc, and the like.

In some embodiments, mechanisms that degrade a zinc-air battery assembly 100 during storage and use can be (1) corrosion of the zinc with hydrogen gas evolution and/or (2) gas transfer. Gas transfer can include direct oxidation of the zinc anode material 140, carbonation of an electrolyte, and electrolyte water gain or loss. During storage, air access holes 160 of the cell can be sealed to minimize degradation by gas transfer. Adhesive tape containing a polyester assembly 100 is not in use.

Figure 10A:
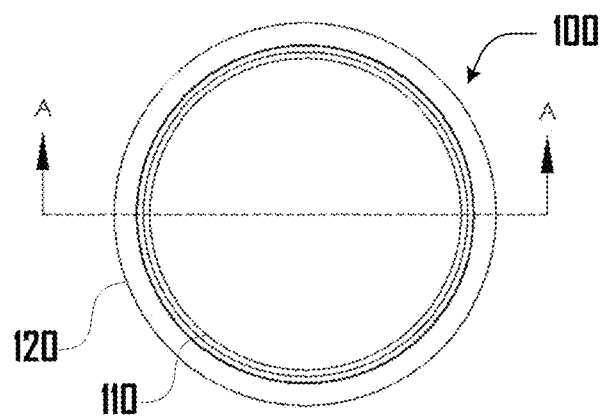
FIG. 10a illustrates a top view of a zinc-air battery assembly of one embodiment.
Figure 10B:
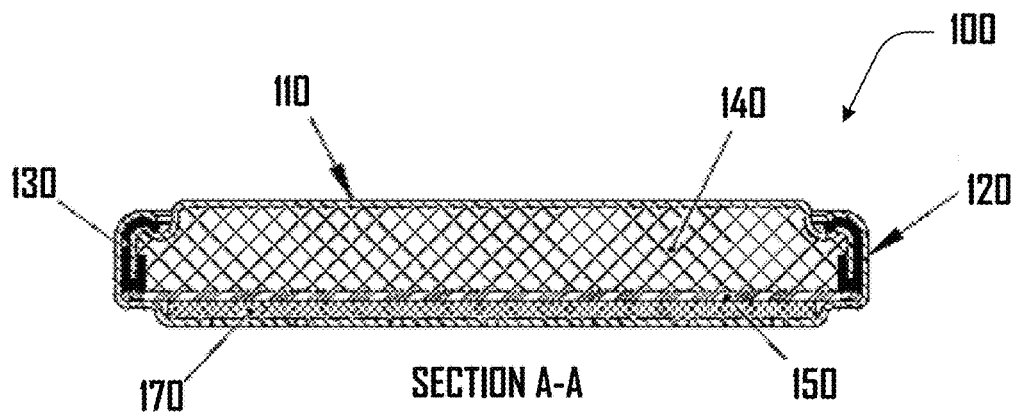
Figure 10C:
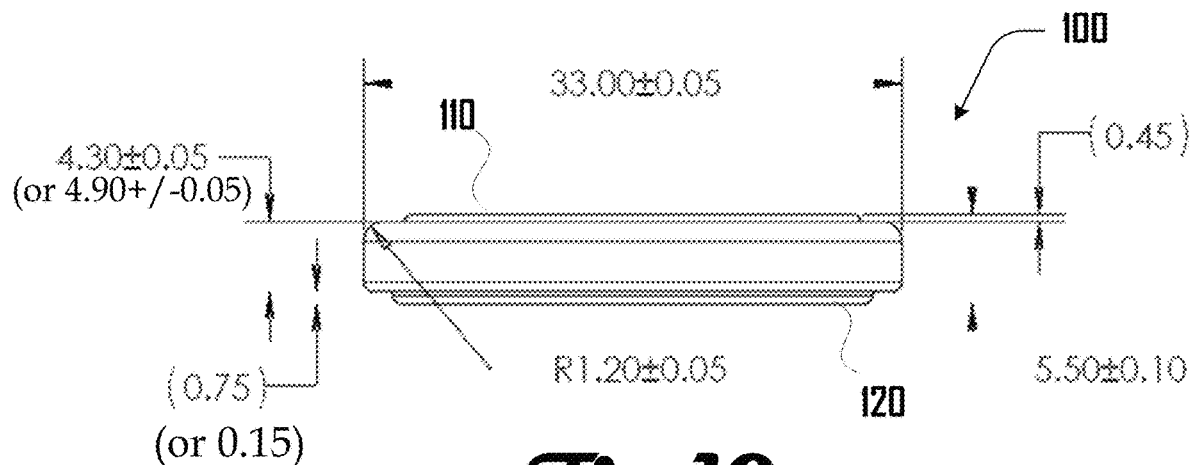
FIG. 10c illustrates example dimensions on one specific example embodiment of a zinc-air battery assembly.

A zinc-air battery assembly 100 and components thereof can be configured in any suitable way. For example, FIGS. 10a-18 illustrate example embodiments of a zinc-air battery assembly 100 and/or components thereof. For example, FIG. 10a illustrates a top view of a zinc-air battery assembly 100 of one embodiment, FIG. 10b illustrates an example cross section of the embodiment of FIG. 10a, and FIG. 10c illustrates example dimensions on one specific example embodiment of a zinc-air battery assembly 100 in millimeters. FIG. 11a illustrates a top view of a grommet 130 in accordance with an embodiment, FIG. 11b illustrates a cross section of the example embodiment of FIG. 11a with example dimensions in millimeters, and FIG. 11c illustrates a detail view of a portion of FIG. 11b.

Figure 12A:
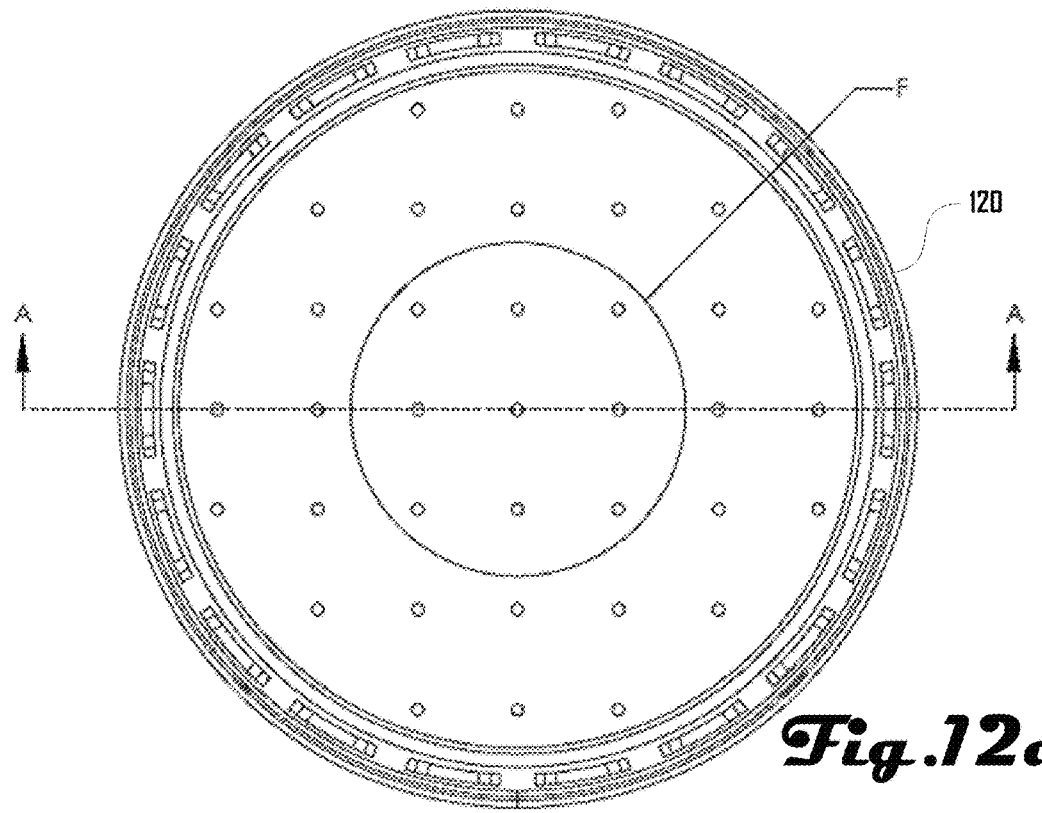
FIG. 12a illustrates an example embodiment of a cathode can.
Figure 12B:
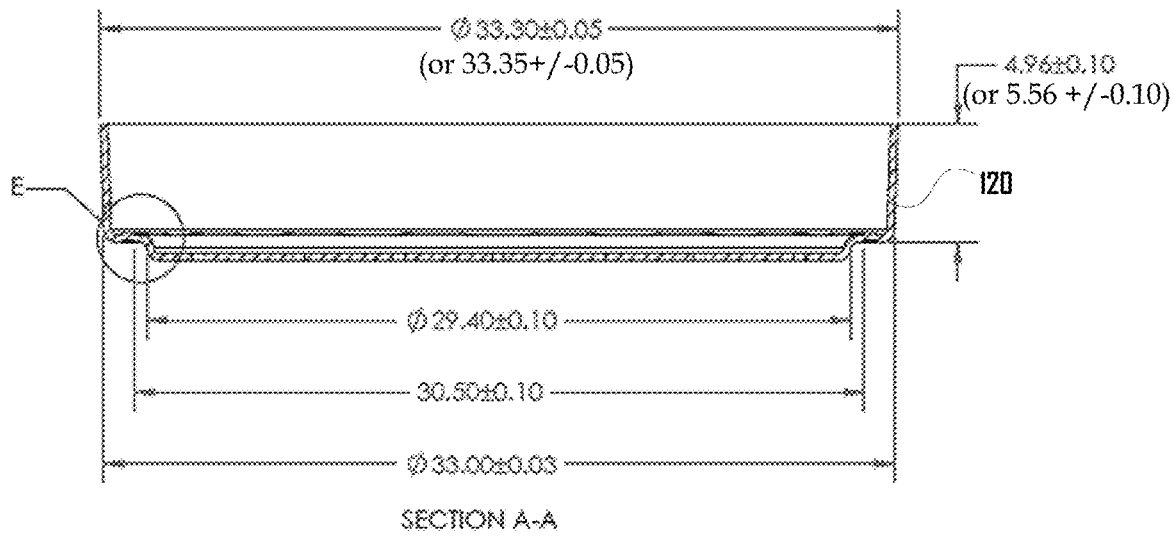
Figure 13A:
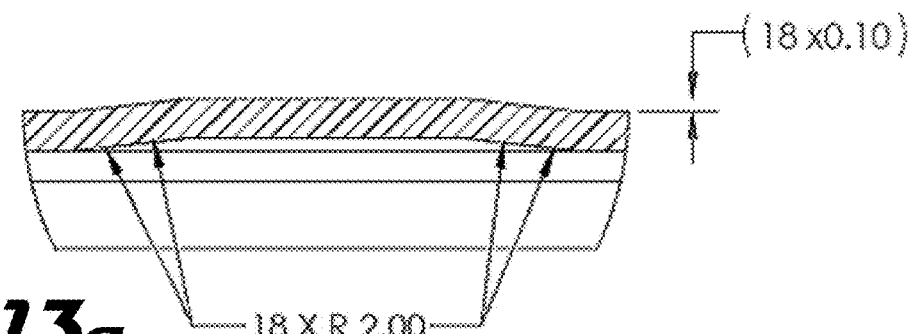
FIG. 13a illustrates a close-up detail view of a portion of a cathode can.
Figure 13B:
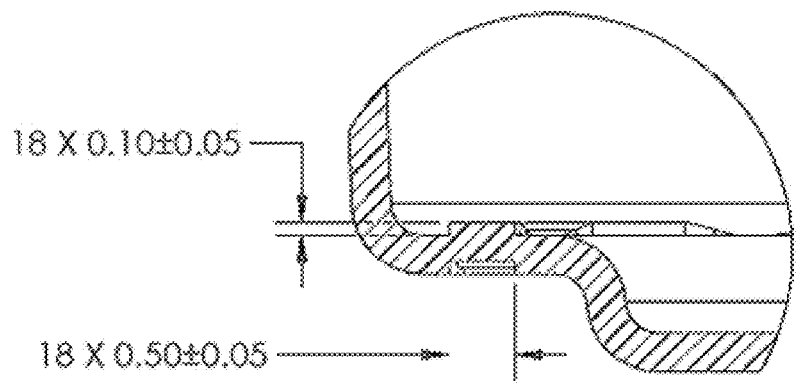
FIG. 13b illustrates a close-up detail view of the cathode can of FIGS. 12a and 12b.
Figure 13C:
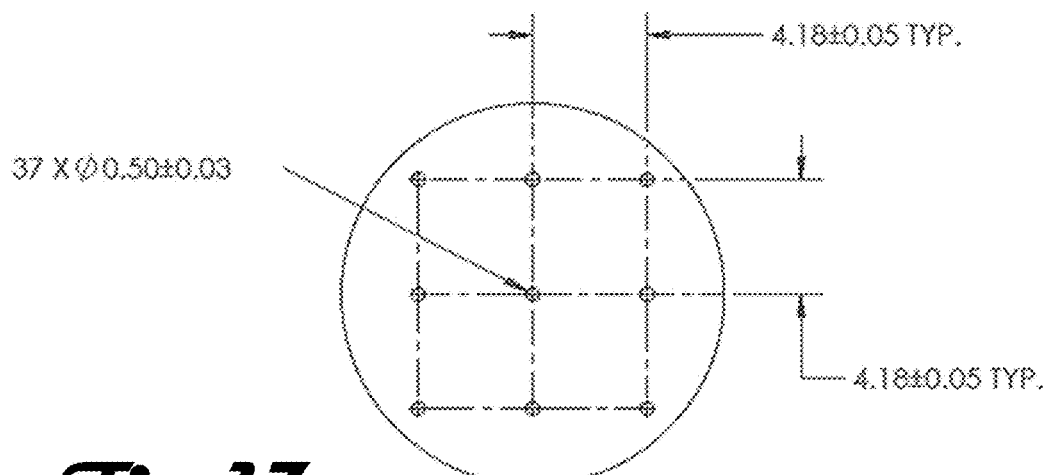
FIG. 13c illustrates a close-up detail view of the cathode can of FIGS. 12a and 12b.

FIG. 12a illustrates an example embodiment of a cathode can 120 and FIG. 12b illustrates a cross-section of the embodiment of FIG. 12a with example dimensions in millimeters. FIG. 13a illustrates a close-up detail view of a portion of a cathode can 120, FIG. 13b illustrates a close-up detail view of the cathode can 120 of FIGS. 12a and 12b with example dimensions in millimeters, and FIG. 13c illustrates a close-up detail view of the cathode can 120 of FIGS. 12a and 12b with example dimensions in millimeters.

Figure 15A:
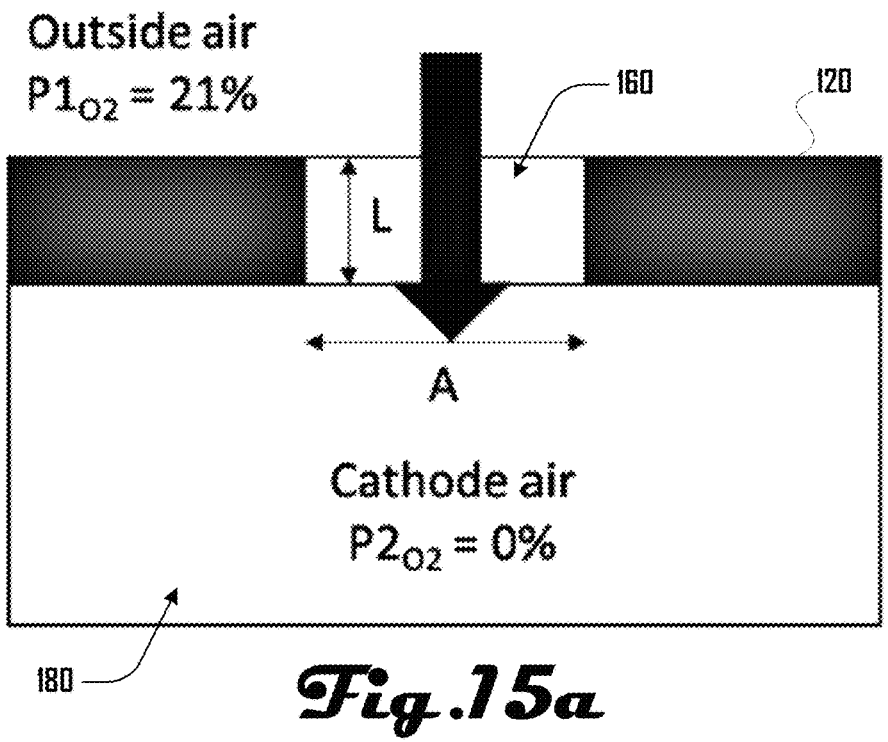
FIG. 15a illustrates an example of air diffusion into the cavity of a zinc-air battery assembly via a hole defined by a cathode can.
Figure 15B:
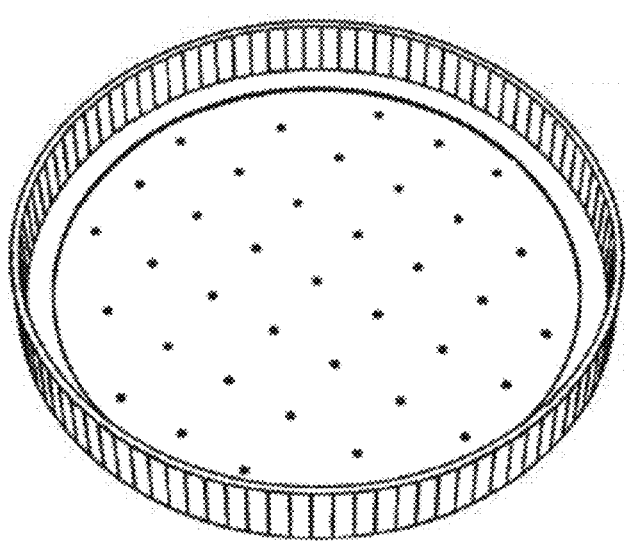
FIG. 15b illustrates a perspective view of an example embodiment of a cathode can.
Figure 15C:
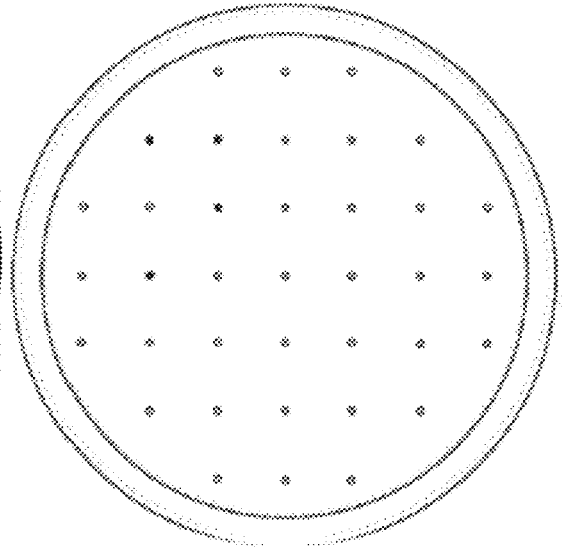
FIG. 15c illustrates a top view of the cathode can of FIG. 15b.

FIG. 14a illustrates an example embodiment of an anode can 110, FIG. 14b illustrates a cross section of the example embodiment of the anode can 110 of FIG. 14a with example dimensions in millimeters, and FIG. 14c illustrates a close-up detail view of a portion of FIG. 14b with example dimensions in millimeters. FIG. 15a illustrates an example of air diffusion into the cavity 180 of a zinc-air battery assembly 100 via a hole 160 defined by a cathode can 120, FIG. 15b illustrates a perspective view of an example embodiment of a cathode can 120 and FIG. 15c illustrates a top view of the cathode can 120 of FIG. 15b.

Figure 16:
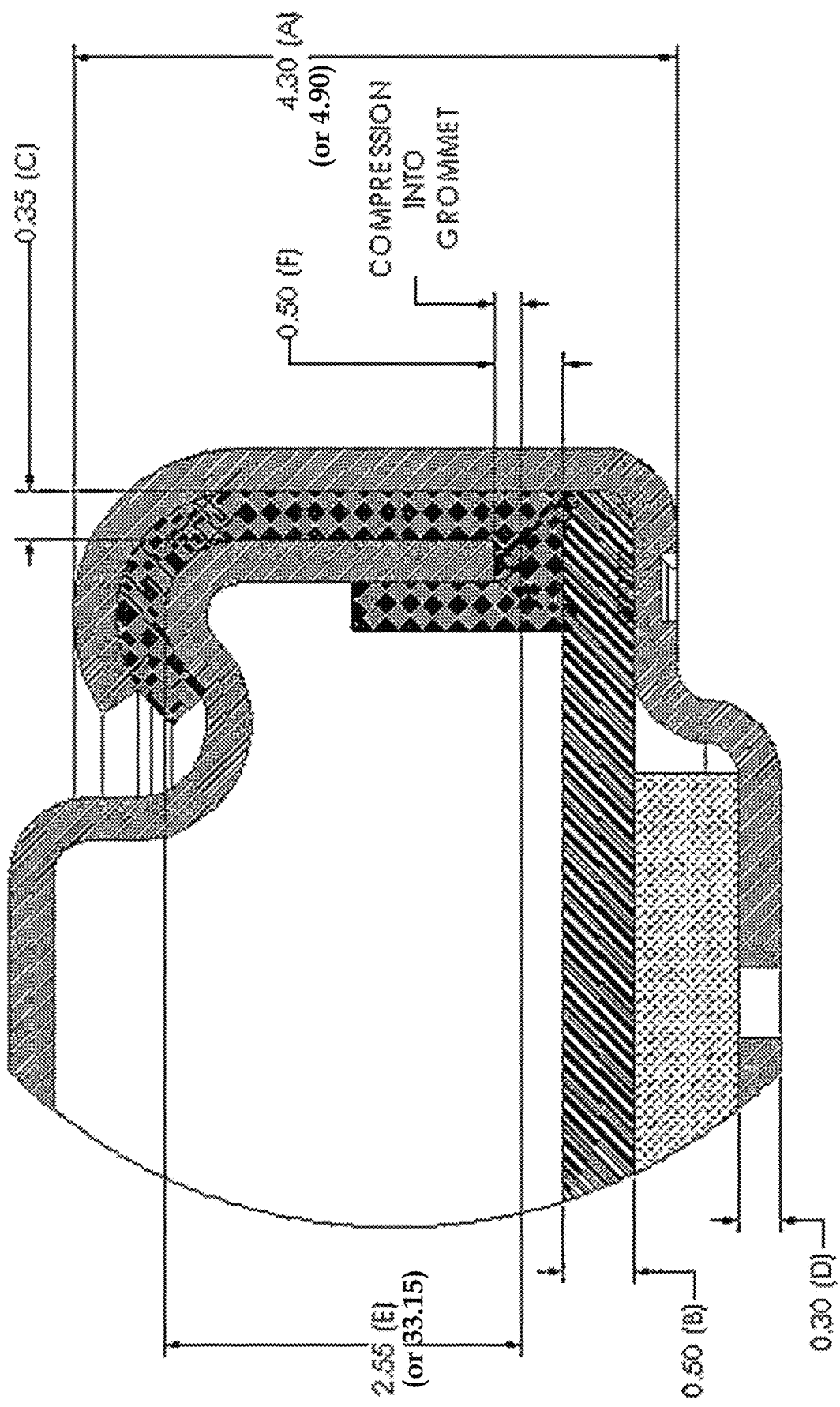
FIG. 16 illustrates a close-up cross sectional view of a portion of a zinc-air battery assembly.
Figure 17A:
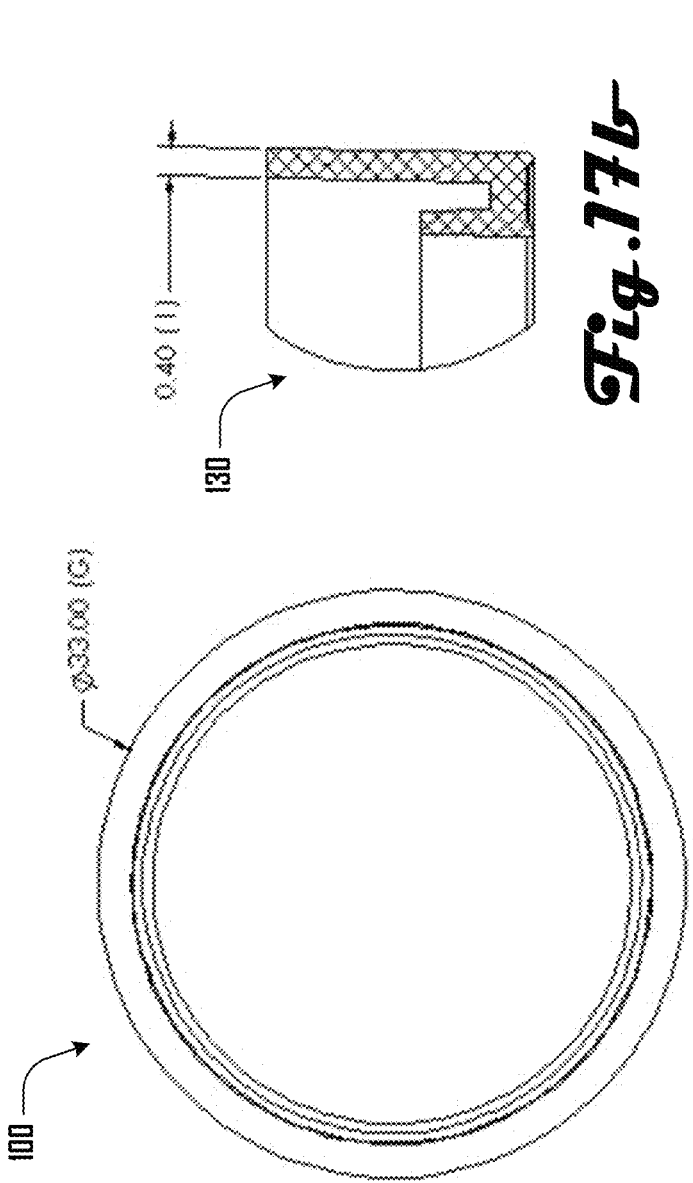
FIG. 17a illustrates a top view of an embodiment of a zinc-air battery assembly.
Figure 17B:
FIG. 17b illustrates an embodiment of a grommet.
Figure 17C:
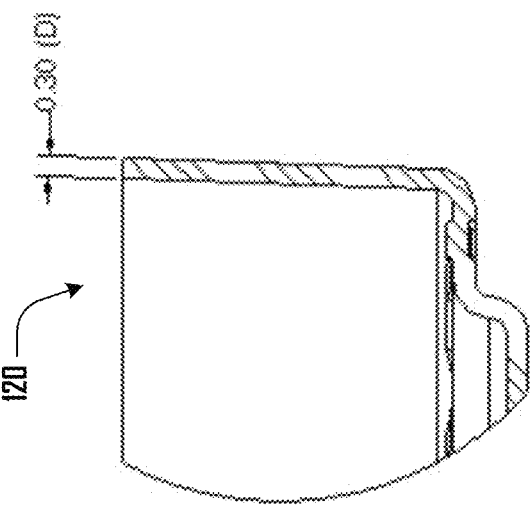
FIG. 17c illustrates an embodiment of a cathode can.
Figure 17D:
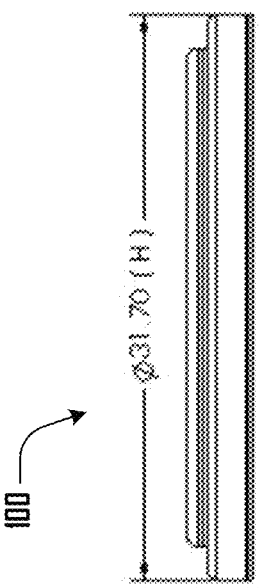
FIG. 17d illustrates a side view of an embodiment of a zinc-air battery assembly.
Figure 18C:
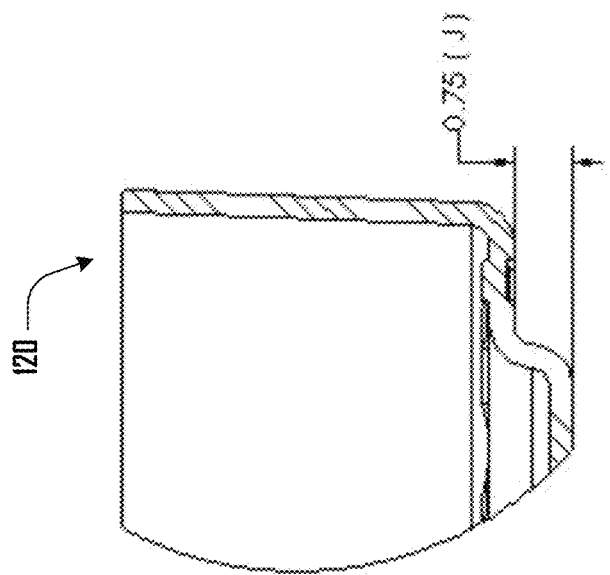
FIG. 18c illustrates an example embodiment of a cathode can.
Figure 18B:
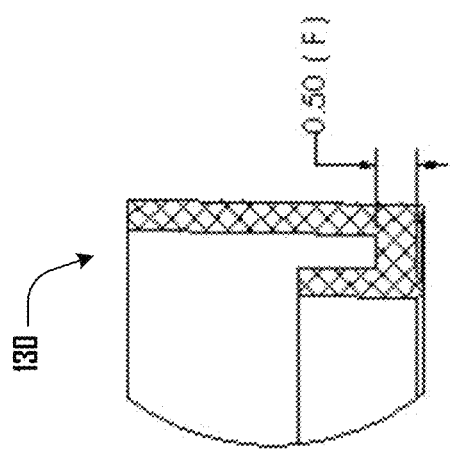
FIG. 18b illustrates an example embodiment of a grommet.
Figure 18A:
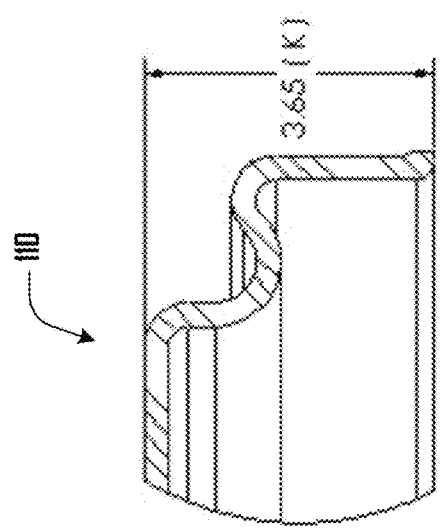
FIG. 18a illustrates an example embodiment of an anode can

FIG. 16 illustrates a close-up cross sectional view of a portion of a zinc-air battery assembly 100 with example and non-limiting dimensions in millimeters. FIG. 17a illustrates a top view of an embodiment of a zinc-air battery assembly 100, FIG. 17b illustrates an embodiment of a grommet 130, FIG. 17c illustrates an embodiment of a cathode can 120, and FIG. 17d illustrates a side view of an embodiment of a zinc-air battery assembly 100 with example dimensions in millimeters. FIG. 18a illustrates an example embodiment of an anode can 110, FIG. 18b illustrates an example embodiment of a grommet 130, and FIG. 18c illustrates an example embodiment of a cathode can 120, with example dimensions in millimeters.

Figure 6:
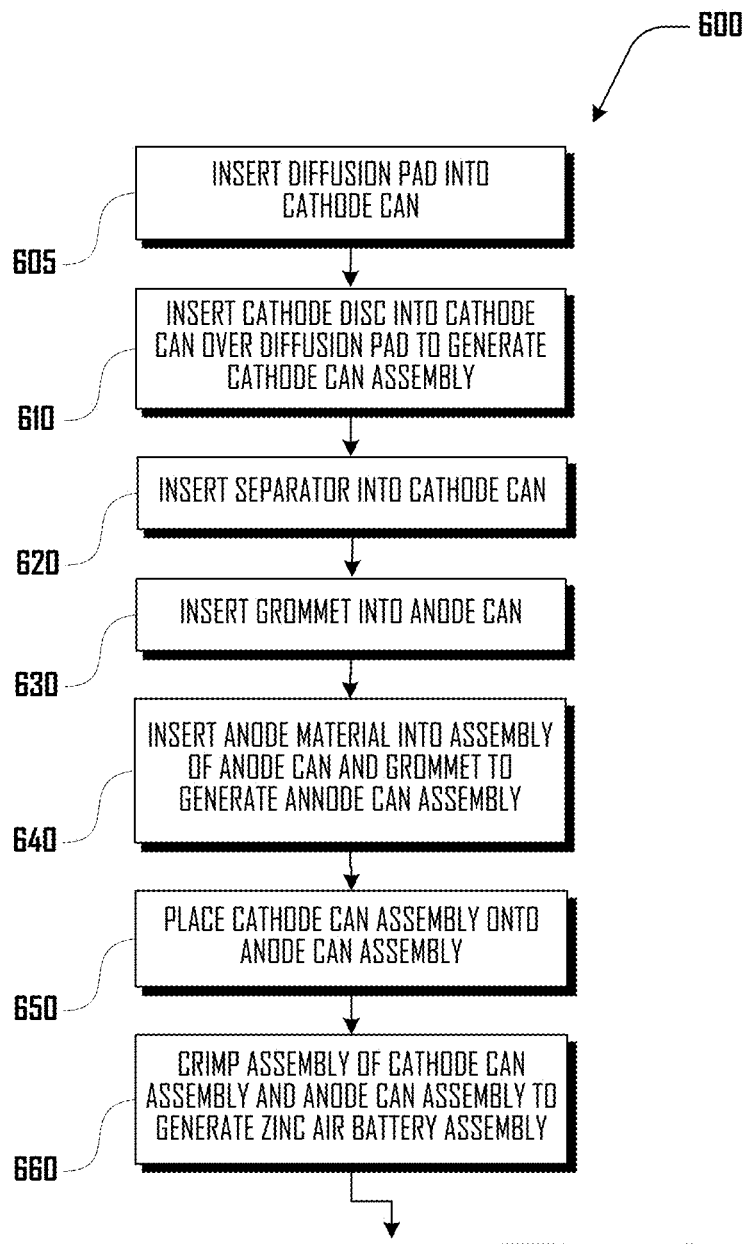
FIG. 6 illustrates an example method of making a zinc-air battery assembly in accordance with an embodiment.

FIG. 6 illustrates an example method 600 of making a zinc-air battery assembly 100 in accordance with an embodiment. The method 600 begins at 605 where a diffusion pad (e.g., diffusion member 170) is inserted into the cavity 180 of a cathode can 120 (see, e.g., FIG. 7a), and at 610, a cathode disc (e.g., cathode material 150, cathode assembly 200, or the like) is inserted into the cavity 180 of a cathode can 120 over the separator to generate a cathode can assembly (see, e.g., FIG. 7b).

At 620, a separator (e.g., separator 190) is inserted into the cavity 180 of the cathode can 120 over the cathode disc. However, note that in some embodiments, the cathode disc can comprise a separator, so the step of 620 can be absent and a separator (e.g., separator 190 or 240) can be introduced via the cathode disc. Similarly, in some embodiments, the cathode disc can include a diffusion pad, so the step 605 can be absent and the diffusion pad (e.g., diffusion member 170, 210) can be introduced via the cathode disc.

At 630, a grommet 130 is inserted into an anode can 110 (see, e.g., FIG. 8a) and at 640, anode material 140 is inserted into the assembly of the anode can 110 and grommet 130 assembled at 630 to generate an anode can assembly (see e.g., FIG. 8b). At 650, the cathode can assembly generated at 620 is placed into the anode can assembly generated at 640, and at 660, the assembly generated at 650 is crimped to generate a zinc-air battery assembly 100. For example, the terminal end 124 of the cathode can sidewall 123 can initially be in a straight configuration as shown in FIGS. 4 and 9a and can be crimped to a curved configuration as shown in FIG. 5 or 9b such that the end 124 of the cathode sidewall 123 curls over the ridge 113 and slot 112 of the anode can 110, which can create a seal between the anode can 110 and cathode can 120 via the grommet 130 as discussed herein.

In some embodiments, a cathode assembly 200, including the separator layer 240 can be shipped to a button cell manufacturer to generate a zinc-air battery cell assembly 100 having the air cathode assembly 200 and an anode material 140 disposed in the cavity 180 defined by anode can 110 and cathode can 120 as discussed herein.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. A zinc-air battery cell assembly comprising:
   a metal cathode can that includes:
   a planar base,
   an elongated cathode sidewall that extends approximately perpendicular to a plane of the planar base, the elongated cathode sidewall extending to a terminal cathode sidewall end, and a plurality of air holes defined by the planar base;
a metal anode can that includes:
   a planar top end,
   an elongated anode sidewall that extends approximately perpendicular to a plane of the planar top end, the elongated anode sidewall extending to a terminal anode sidewall end, the metal anode can disposed nested within the metal cathode can with the elongated anode sidewall disposed parallel and adjacent to the elongated cathode sidewall;
a cavity defined by the metal cathode can and the metal anode disposed nested within the metal cathode can,
a set of materials disposed within the cavity, the set of materials including:
   a layer of anode material that includes:
      zinc at 62-74% Weight %,
      an aqueous electrolyte comprising by weight, 30-40% potassium hydroxide, 1%-5% Zinc Oxide,
      one or more gelling agents in an aqueous slurry, and
      one or more corrosion inhibitors, including 18 Crown 6, that causes the layer of anode material to have a gassing rate less than or equal to 0.5 cm$^3$ after 1 week at 60° C.,
   a void volume directly between and defined by the layer of anode material and the planar top end of the metal anode can,
   a layer of cathode material that includes:
      a carbon-polymer composite;
      metal oxides that promote an oxygen reduction reaction;
      a carbon-covered nickel mesh embedded within the composite and fixed to an internal face of the metal cathode can with either pressure or a conductive glue, the carbon-covered nickel mesh defined by a plurality of elongated grid elements disposed in a plurality of parallel rows and parallel columns, with the rows and columns being perpendicular to each other and engaging at a plurality of intersections,
   a separator directly between and engaging both the layer of anode material and the layer of cathode material that acts as both an electronic insulator and an ion conductive path between the layer of anode material and the layer of cathode material, the separator including polyvinyl alcohol (PVA) fibers blended with cellulose and
   a conductive diffusion member directly between and engaging both the planar base of the metal cathode can and the layer of cathode material; and
a grommet that provides a seal between the metal cathode can and the metal anode can while also keeping the metal anode can and metal cathode can physically and electrically separate.

2. The zinc-air battery cell assembly of claim 1, wherein the zinc-air battery cell assembly generates a power discharge of 50-135 mW/cm$^2$.

3. The zinc-air battery cell assembly of claim 1, wherein the inhibitor of the layer of anode material further comprises one or more of: Polyethylene Glycol (PEG), 15-Crown-5, 12-Crown-4, Diaza-18-Crown-6, Di-Benzo-18 Crown-6, a Diazacrown, a Cryptand, an Azo-Crown, a Lariat, a Nonionic Alkyl and/or Aryl Phosphate surfactant, Sodium dodecylbenzenesulfonate, and indium hydroxide.

4. The zinc-air battery cell assembly of claim 1, wherein the conductive diffusion member comprises at least one of carbon foam, carbon felt, carbon paper material, and a nickel mesh diffusion pad, and wherein the conductive diffusion member has a porosity/open area of greater than 60% and an electronic resistance of less than 20 mohm/cm$^2$.

5. The zinc-air battery cell assembly of claim 1, wherein a layer of active cathode comprises carbons and dispersed manganese dioxide mixed together with a dispersion of polytetrafluoroethylene (PTFE) in water.

6. The zinc-air battery cell assembly of claim 1, wherein the void volume is between 15% to 25% of a total volume of the cavity defined by the metal cathode can and the metal anode can.

7. The zinc-air battery cell assembly of claim 1, wherein the zinc-air battery cell assembly is a single use zinc-air battery cell assembly such that the zinc-air battery cell assembly is configured for only being discharged once without the ability to re-charge the zinc-air battery cell assembly after being discharged.

8. A zinc-air battery cell assembly comprising:
   a cathode can,
   an anode can,
   a cavity defined by the cathode can and the anode disposed nested within the cathode can, and
   a set of materials disposed within the cavity, the set of materials including:
      a layer of anode material, wherein the layer of anode material comprises one or more corrosion inhibitors, including 18-Crown-6, that causes the layer of anode material to have a gassing rate less than or equal to 0.5 cm$^3$ after 1 week at 60° C.,
      a void volume between and defined by the layer of anode material and the anode can,
      one or more layers of cathode material,
      a separator directly between and engaging both the layer of anode material and the layer of cathode material that acts as both an electronic insulator and an ion conductive path between the layer of anode material and the layer of cathode material, and
      a conductive diffusion member directly between and engaging both the cathode can and an active cathode layer.

9. The zinc-air battery cell assembly of claim 8, wherein the layer of anode material comprises zinc at 62-74% Weight %.

10. The zinc-air battery cell assembly of claim 8, wherein the layer of anode material comprises an aqueous electrolyte comprising 30%-40% Weight % potassium hydroxide and one or more inhibitors.

11. The zinc-air battery cell assembly of claim 8, wherein the layer of anode material comprises one or more gelling agents in an aqueous slurry.

12. The zinc-air battery cell assembly of claim 8, wherein the one or more layers of cathode material comprise a nickel mesh embedded within a composite.

13. The zinc-air battery cell assembly of claim 12, wherein the nickel mesh is coated in a carbon or graphite paint.

14. The zinc-air battery cell assembly of claim 12, wherein the separator includes polyvinyl alcohol (PVA) fibers blended with or without cellulose.

15. A zinc-air battery cell assembly comprising:
   a layer of anode material, wherein the layer of anode material comprises one or more corrosion inhibitors, including 18-Crown-6, that causes the layer of anode material to have a gassing rate less than or equal to 0.5 cm$^3$ after 1 week at 60° C.;
   one or more layers of cathode material;

a separator directly between and engaging both the layer of anode material and the layer of cathode material that acts as both an electronic insulator and an ion conductive path between the layer of anode material and the layer of cathode material; and a diffusion member directly engaging the layer of cathode material.

16. The zinc-air battery cell assembly of claim 15, wherein the layer of anode material comprises zinc at 62-74% Weight %.

17. The zinc-air battery cell assembly of claim 15, wherein the layer of anode material comprises an aqueous electrolyte comprising 33%-37% Weight % potassium hydroxide and an inhibitor.

18. The zinc-air battery cell assembly of claim 15, wherein the layer of anode material comprises a corrosion inhibitor that causes the layer of anode material to have a gassing rate less than or equal to $0.5 \text{ cm}^3$ after 1 week at 60° C.

19. The zinc-air battery cell assembly of claim 15, wherein the layer of cathode material comprises a metal mesh embedded within a composite.

* * * * *